(12) United States Patent
Hettrich et al.

(10) Patent No.: US 11,673,486 B2
(45) Date of Patent: *Jun. 13, 2023

(54) BATTERY THERMAL MANAGEMENT SYSTEM AND METHODS OF USE

(71) Applicant: QuantumScape Battery, Inc., San Jose, CA (US)

(72) Inventors: Kevin Hettrich, Mountain View, CA (US); Tomasz Wojcik, Sunnyvale, CA (US)

(73) Assignee: QuantumScape Battery, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/533,626

(22) Filed: Nov. 23, 2021

(65) Prior Publication Data

US 2022/0371473 A1 Nov. 24, 2022

Related U.S. Application Data

(63) Continuation of application No. 17/321,783, filed on May 17, 2021, now abandoned, which is a continuation of application No. 16/436,878, filed on Jun. 10, 2019, now Pat. No. 11,040,635, which is a continuation of application No. 15/608,836, filed on May 30, 2017, now Pat. No. 10,369,899, which is a
(Continued)

(51) Int. Cl.
*B60L 58/27* (2019.01)
*H04W 4/029* (2018.01)

(52) U.S. Cl.
CPC ............. *B60L 58/27* (2019.02); *H04W 4/029* (2018.02); *Y02T 10/70* (2013.01)

(58) Field of Classification Search
CPC ... B60L 58/24–27; H04W 4/029; Y02T 10/70
See application file for complete search history.

(56) References Cited

U.S. PATENT DOCUMENTS

| 4,189,528 A | 2/1980 | Klootwyk |
| 5,369,351 A | 11/1994 | Adams |
| 5,482,790 A | 1/1996 | Yamada et al. |

(Continued)

FOREIGN PATENT DOCUMENTS

| CN | 202507950 U | 10/2012 |
| DE | 102009046567 | 5/2011 |

(Continued)

OTHER PUBLICATIONS

European Search Report for Application No. 14154567.3 dated Aug. 8, 2014; 9 pages.
(Continued)

*Primary Examiner* — Aaron L Troost
(74) *Attorney, Agent, or Firm* — Squire Patton Boggs (US) LLP

(57) ABSTRACT

Set forth herein are systems and methods for determining battery heating conditions and pre-heating lead times of at least a minute or more, based on input parameters and sets of input parameters, to predictively and dynamically heat a secondary battery so that the battery has a specific power output and performance level when used in an electric or hybrid vehicle application.

10 Claims, 16 Drawing Sheets

Related U.S. Application Data continuation of application No. 14/838,218, filed on Aug. 27, 2015, now Pat. No. 9,834,114.

(60) Provisional application No. 62/042,734, filed on Aug. 27, 2014.

(56) References Cited

U.S. PATENT DOCUMENTS

| | | | |
|---|---|---|---|
| 5,618,641 A | 4/1997 | Arias | |
| 6,271,648 B1 | 8/2001 | Miller | |
| 3,357,541 A1 | 3/2002 | Matsuda et al. | |
| 6,624,615 B1 | 9/2003 | Park | |
| 6,641,942 B1 | 11/2003 | Rouillard et al. | |
| 6,942,944 B2 | 9/2005 | Al-Hallaj et al. | |
| 7,148,637 B2 | 12/2006 | Shu et al. | |
| 7,154,068 B2 | 12/2006 | Zhu et al. | |
| 7,761,198 B2 | 7/2010 | Bhardwaj | |
| 7,933,695 B2 | 4/2011 | Yamaguchi | |
| 7,936,150 B2 | 5/2011 | Milios | |
| 8,190,320 B2 | 5/2012 | Kelty et al. | |
| 8,343,642 B2 | 1/2013 | Culver et al. | |
| 8,471,521 B2 | 6/2013 | Stewart et al. | |
| 8,543,270 B2 | 9/2013 | Kelty et al. | |
| 9,106,077 B2 | 8/2015 | Nakahara et al. | |
| 9,321,340 B2 | 4/2016 | Maskew et al. | |
| 9,362,546 B1 | 6/2016 | Donnelly et al. | |
| 9,393,921 B1 | 7/2016 | Weicker et al. | |
| 9,553,346 B2 | 1/2017 | Hermann | |
| 9,834,114 B2* | 12/2017 | Hettrich | B60L 58/27 |
| 9,960,458 B2 | 5/2018 | Weicker et al. | |
| 10,369,899 B2* | 8/2019 | Hettrich | H04W 4/029 |
| 10,889,205 B2 | 1/2021 | Hettrich et al. | |
| 11,011,783 B2 | 5/2021 | Hermann et al. | |
| 11,040,635 B2* | 6/2021 | Hettrich | H04W 4/029 |
| 2001/0040061 A1 | 11/2001 | Matuda et al. | |
| 2002/0022178 A1 | 2/2002 | Asaka et al. | |
| 2003/0008205 A1 | 1/2003 | Horie et al. | |
| 2003/0184307 A1 | 10/2003 | Kozlowski et al. | |
| 2003/0186116 A1 | 10/2003 | Tanjou | |
| 2004/0180263 A1 | 9/2004 | Kase et al. | |
| 2005/0084754 A1 | 4/2005 | Klein | |
| 2005/0248313 A1 | 11/2005 | Thorland | |
| 2006/0240318 A1 | 10/2006 | Kim et al. | |
| 2007/0087266 A1 | 4/2007 | Bourke et al. | |
| 2007/0166574 A1 | 7/2007 | Nakashima et al. | |
| 2008/0213652 A1 | 9/2008 | Scheucher | |
| 2008/0299451 A1 | 12/2008 | Funahashi et al. | |
| 2009/0123820 A1 | 5/2009 | Han | |
| 2009/0239130 A1 | 9/2009 | Culver et al. | |
| 2009/0243538 A1* | 10/2009 | Kelty | H01M 10/615 320/104 |
| 2009/0325043 A1 | 12/2009 | Yoon et al. | |
| 2010/0082227 A1 | 4/2010 | Posner et al. | |
| 2010/0089547 A1 | 4/2010 | King et al. | |
| 2010/0140246 A1* | 6/2010 | Grider | B60L 58/40 219/205 |
| 2010/0217485 A1 | 8/2010 | Ichishi | |
| 2010/0258063 A1 | 10/2010 | Thompson | |
| 2010/0273042 A1 | 10/2010 | Buck et al. | |
| 2010/0273044 A1 | 10/2010 | Culver et al. | |
| 2010/0297483 A1 | 11/2010 | Kawai | |
| 2011/0076521 A1 | 3/2011 | Shimizu et al. | |
| 2011/0153140 A1 | 6/2011 | Datta et al. | |
| 2011/0159351 A1 | 6/2011 | Culver et al. | |
| 2011/0177383 A1 | 7/2011 | Culver et al. | |
| 2011/0267007 A1 | 11/2011 | Chen et al. | |
| 2012/0148889 A1 | 1/2012 | Miller et al. | |
| 2012/0046815 A1 | 2/2012 | Hermann et al. | |
| 2012/0058377 A1 | 3/2012 | Sastry et al. | |
| 2012/0126753 A1 | 5/2012 | Carkner et al. | |
| 2012/0158228 A1 | 6/2012 | Blondo et al. | |
| 2012/0295142 A1 | 11/2012 | Yan et al. | |
| 2012/0316712 A1* | 12/2012 | Simonini | H01M 10/625 701/22 |
| 2012/0328908 A1 | 12/2012 | Han et al. | |
| 2013/0004804 A1 | 1/2013 | Robertson et al. | |
| 2013/0022848 A1 | 1/2013 | Schroeter et al. | |
| 2013/0059172 A1 | 3/2013 | Sastry et al. | |
| 2013/0101878 A1 | 4/2013 | Pilgram et al. | |
| 2013/0103240 A1 | 4/2013 | Sato et al. | |
| 2013/0202929 A1 | 8/2013 | Kako et al. | |
| 2013/0218447 A1 | 8/2013 | Mayinger | |
| 2013/0230759 A1 | 9/2013 | Jeong et al. | |
| 2013/0028061 A1 | 10/2013 | Hwang et al. | |
| 2014/0023905 A1 | 1/2014 | Taniyama et al. | |
| 2014/0038009 A1 | 2/2014 | Okawa et al. | |
| 2014/0041826 A1 | 2/2014 | Takeuchi et al. | |
| 2014/0070013 A1 | 3/2014 | Stanek et al. | |
| 2014/0093760 A1 | 4/2014 | Hermann et al. | |
| 2014/0117291 A1 | 5/2014 | Amatucci et al. | |
| 2014/0141300 A1 | 5/2014 | Ronning et al. | |
| 2014/0170493 A1 | 6/2014 | Holme et al. | |
| 2014/0227568 A1 | 8/2014 | Hermann | |
| 2014/0227597 A1 | 8/2014 | Nemoto et al. | |
| 2014/0265554 A1 | 9/2014 | Yang et al. | |
| 2014/0272564 A1 | 9/2014 | Holme et al. | |
| 2014/0279723 A1 | 9/2014 | McGavran et al. | |
| 2014/0284526 A1 | 9/2014 | Shan | |
| 2015/0000327 A1 | 1/2015 | Kakenashi et al. | |
| 2015/0037626 A1 | 2/2015 | Malcolm et al. | |
| 2015/0214586 A1 | 7/2015 | Yeow et al. | |
| 2015/0217622 A1 | 8/2015 | Enomoto et al. | |
| 2015/0217623 A1 | 8/2015 | Hatakeyama et al. | |
| 2015/0243974 A1 | 8/2015 | Holme et al. | |
| 2015/0255998 A1 | 9/2015 | Hasegawa et al. | |
| 2015/0258875 A1 | 9/2015 | Enomoto et al. | |
| 2016/0049655 A1 | 2/2016 | Fasching et al. | |
| 2016/0059733 A1 | 3/2016 | Hettrich et al. | |
| 2016/0068123 A1 | 3/2016 | Helmhold et al. | |
| 2016/0082860 A1 | 3/2016 | Marchal et al. | |
| 2016/0164135 A1 | 6/2016 | Fasching et al. | |
| 2016/0218401 A1 | 7/2016 | Hermann et al. | |
| 2016/0380315 A1 | 12/2016 | Weicker et al. | |

FOREIGN PATENT DOCUMENTS

| | | | |
|---|---|---|---|
| JP | 3585992 B2 | 11/2004 | |
| JP | 2010110196 A * | 5/2010 | B60L 11/1816 |
| JP | 2010-281561 | 12/2010 | |
| JP | 2012-236577 | 12/2012 | |
| WO | WO 2009/001916 A1 | 12/2008 | |
| WO | WO 2009/120369 A2 | 10/2009 | |
| WO | WO 2012/144148 | 10/2012 | |
| WO | WO 2014/061761 A1 | 10/2014 | |
| WO | WO 2015/010179 A1 | 1/2015 | |
| WO | WO 2015/031908 | 3/2015 | |
| WO | WO 2015/054320 | 4/2015 | |
| WO | WO 2015/076944 | 5/2015 | |
| WO | WO 2015/103548 | 7/2015 | |
| WO | WO 2016/106321 | 6/2016 | |

OTHER PUBLICATIONS

International Search Report and Written Opinion of PCT/US2015/010179 dated Apr. 21, 2015, 11 pages.

Plichta, Edward, et al. "Low Temperature Electrolyte for Lithium and Lithium-Ion Batteries," Proceedings of the 38th Power Sources Conference, Jun. 8-11, 1998, pp. 444-447.

U.S. Appl. No. 14/146,728, titled "Thin Film Lithium Conducting Powder Material Deposition From Flux," by Donnelly et al., filed Jan. 3, 2014.

Wang et al., "Conversion Reaction Mechanisms in Lithium Ion Batteries: Study of the Binary Metal Fluoride Electrodes", Journal of the American Chemical Society, 2011, vol. 133, pp. 18828-18836.

* cited by examiner

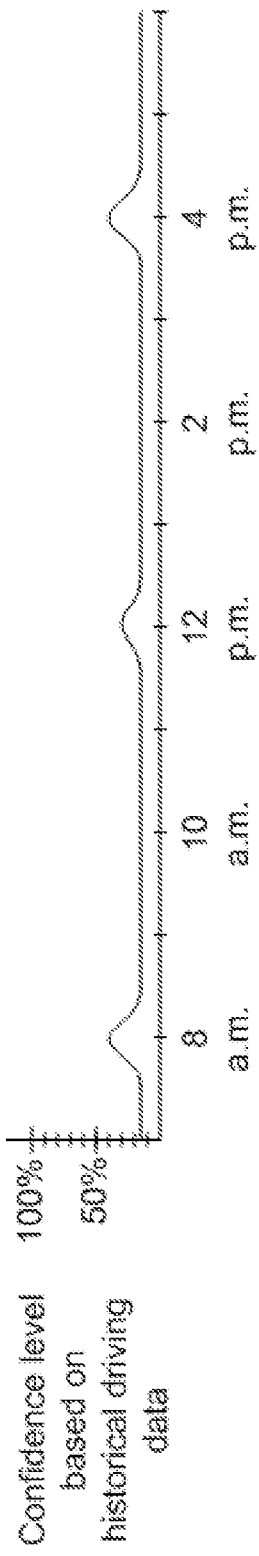
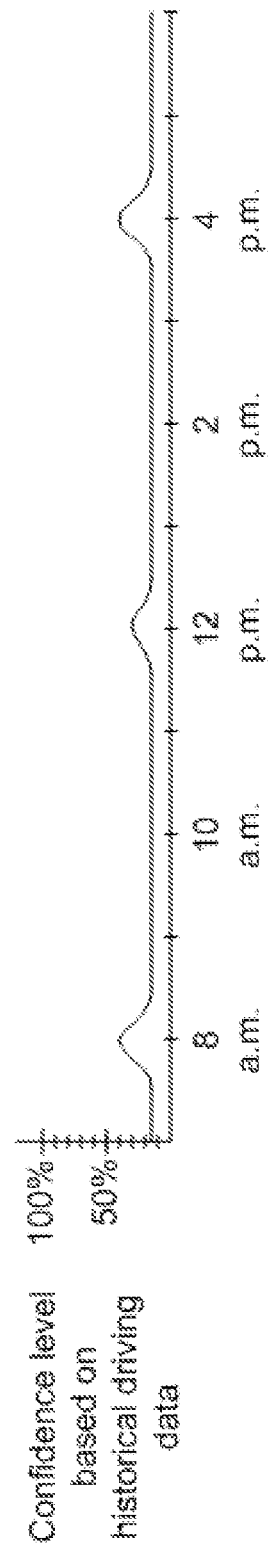
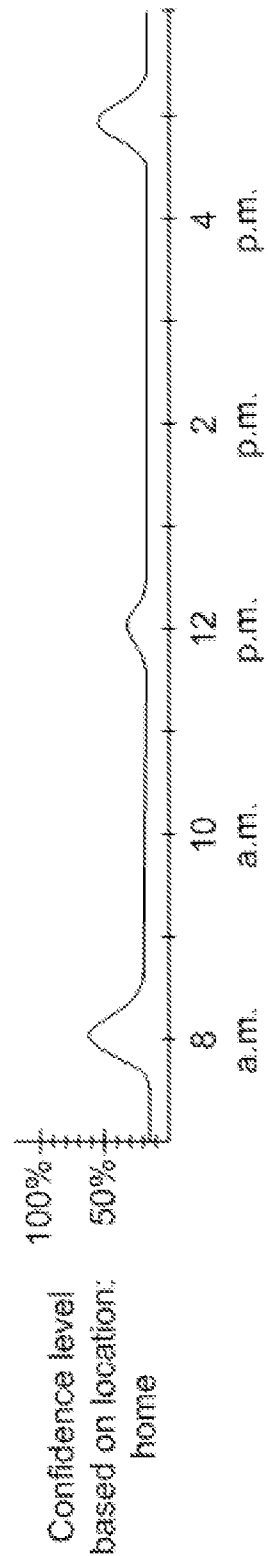
FIG. 5A
FIG. 5B

BATTERY THERMAL MANAGEMENT SYSTEM AND METHODS OF USE

CROSS-REFERENCE TO RELATED APPLICATIONS

This application is a continuation of U.S. application Ser. No. 16/463,878, titled "BATTERY THERMAL MANAGEMENT SYSTEM AND METHODS OF USE" filed on Jun. 10, 2019, which is a continuation of pending U.S. application Ser. No. 15/608,836, titled "BATTERY THERMAL MANAGEMENT SYSTEM AND METHODS OF USE" filed on May 30, 2017, which is a continuation of patented U.S. application Ser. No. 14/838,218, titled "BATTERY THERMAL MANAGEMENT SYSTEM AND METHODS OF USE" filed on Aug. 27, 2015, issued as U.S. Pat. No. 9,834,114, on Dec. 5, 2017, which claims the benefit under 35 U.S.C. § 119(e) to U.S. Provisional Application No. 62/042,734, titled "BATTERY THERMAL MANAGEMENT SYSTEM AND METHODS OF USE," filed Aug. 27, 2014, which are herein incorporated by reference in their entireties and for all purposes.

BACKGROUND

One important component of electrical vehicles is the secondary battery system, which provides power to the vehicle and determines vehicle performance. In many applications, this battery is a lithium secondary battery, for example, a solid state lithium secondary battery. Secondary batteries, as opposed to primary batteries, are rechargeable.

Lithium ion and lithium metal batteries are useful in automotive applications because of their high specific energy and energy density, long cycle life, high round trip efficiency, low self-discharge, and long shelf life. However, some of these batteries exhibit poor low temperature performance, for example, low power output despite having a high energy density. For example, it has been reported that lithium ion cells can lose up to 88% of their room temperature capacity at below $-40°$ C. (See, for example, E. J. Plichta and W. K. Behl, in Proceedings of the 38th Power Sources Conference, Cherry Hill, N.J., p. 444 (1998)).

Furthermore, some next-generation battery technologies and designs are moving in the direction of improving energy density, but may have lower power availability at low or moderate temperatures. Such next-generation batteries may need to be warmed up to 40, 60, or perhaps even 80 degrees Celsius to provide full power.

One strategy to increase low temperature battery performance includes pre-warming of the battery system before use of the battery. As the battery temperature increases, the battery performance increases accordingly and often exponentially so. Pre-warming the battery increases the power available when the vehicle/battery is used.

SUMMARY

The instant disclosure sets forth methods and systems using novel inputs and combinations of inputs to predictively pre-warm a battery with large lead times (e.g., minutes instead of seconds) and with high probability of correctness. The instant disclosure sets forth methods and systems for predicting sufficiently large lead times before an expected drive while minimizing energy losses from early or excessive pre-heating. The instant disclosure sets forth methods, systems, and apparatuses for heating Li-secondary batteries, in some cases to temperatures beyond that which was thought useful (or even possible for stability reasons) for previously known batteries.

The instant disclosure sets forth methods, systems, and apparatuses for pre-heating a lithium secondary battery so that the battery has a predetermined performance at the time that it is actually used in an electric vehicle and without using more energy from the battery than is necessary to achieve this predetermined performance. The instant disclosure sets forth methods, systems, and apparatuses for pre-heating a lithium secondary battery so that the battery has a predetermined performance at the time that it is actually used in an electric vehicle and using the minimum amount of energy from the battery necessary to achieve this predetermined performance. In a number of embodiments, dynamic heating techniques may be used, for example to take advantage of heating that may occur after a drive begins, and/or to take advantage of additional information about the drive. As used herein, dynamic refers to more than one heating step, a heating step having varied heat settings throughout the heating step, more than one heating step wherein at least two heating steps are of different durations (i.e., time), a series of heating steps at either or both different heat settings or heat durations, or combinations thereof.

In one aspect of the embodiments herein, a secondary battery thermal management system is provided, the system including: at least one temperature sensor for determining a temperature of a battery in a vehicle, the battery being a secondary battery; at least one receiver for receiving at least one of a plurality of input parameters; a module configured to send control signals to either the battery or a heating device, wherein the signals result in heating of the battery to temperatures optimized for a predicted vehicle use; wherein the module determines the temperatures optimized for the predicted vehicle use and a heating lead time of at least a minute or more based on the determined temperatures and at least one of the plurality of input parameters.

In various embodiments, the module is selected from a computer, a programmed chip, a battery management system, a controller in series with a potentiostat, a controller in series with a thermocouple, a resistive heater, a computer or electronic device which controls a resistive heater, an inductive heater, a computer or electronic device which controls an inductive heater, a convective heater, a computer or electronic device which controls a convective heater, or similar devices for heating a battery or the area or space in which a battery is housed.

In various embodiments, the battery is a lithium ion secondary battery (e.g., a solid state secondary battery). In some such cases, the lithium ion secondary battery includes a cathode including conversion chemistry active materials. In some embodiments, the lithium ion secondary battery may include a cathode including lithium intercalation chemistry active materials. In a number of embodiments, the receiver may be configured to receive wireless signals. The wireless signals may be selected from the group consisting of Bluetooth signals, cellular signals, Wi-Fi signals, wireless communication device signals, network towers signals, tablets signals, smartphones signals, home security system signals, 3G device transmissions, 4G device transmissions, and combinations thereof.

The plurality of input parameters may be selected from any available source of inputs. In some embodiments, the plurality of input parameters are selected from the group consisting of: vehicle use information, location information, drive types, temperature information, heating device/battery/vehicle information, weather information, driver inputs, user information, external information, traffic information, calendar information, charging equipment availability information, and combinations thereof.

Vehicle use information may in some cases be selected from the group consisting of statistical probability of drive starts as a function of previous drive start, drive times, time of drive starts, drive lengths, drive routes, geography of drives, driving pattern information, past battery warming conditions, past vehicle performance conditions, past battery performance conditions, feedback information, and combinations thereof.

Location information may in some cases be selected from the group consisting of driver location, passenger location, driver location with respect to vehicle location, passenger location with respect to vehicle location, GPS location of user's smartphone, GPS/Wi-Fi/cellular location of fob, proximity of fob to vehicle, GPS/Wi-Fi/cellular location of vehicle key, proximity of vehicle key to vehicle, user's proximity to the vehicle, location of the vehicle, driver location with respect to home, driver location with respect to airport, driver location with respect to work place, driver location with respect to common drive locations, driver location with respect to preselected destinations, driver location with respect to saved destinations, and combinations thereof. Drive type information may in some cases be selected from the group consisting of start location of drives, end location of drives, total distance of drives, average distance of drives, velocity of drives, average velocity of drives, traffic conditions of drives, and combinations thereof.

Temperature information in some cases may be selected from the group consisting of battery temperature, ambient temperature, vehicle temperature, and combinations thereof. Heating device/battery/vehicle information may be selected from the group consisting of battery energy capacity, state of charge of battery, battery self-discharge rate, a relationship between two or more of power of battery, temperature of battery, state of charge of battery, and age of battery, a thermal time constant for the battery, capacity of the heating device, efficiency of the heating device, powertrain of vehicle, thermal system configuration of vehicle, motor power of vehicle, powertrain efficiency of vehicle, vehicle minimum power output level for safe driving, and combinations thereof.

Weather information in various embodiments may be selected from the group consisting of current weather conditions, past weather conditions, historical weather conditions, weather forecast, temperature, precipitation, visibility, and combinations thereof. Driver inputs may in some embodiments be selected from the group consisting of immediate start instructions, delayed start instructions, start cancelation instructions, a user-specified performance level, and combinations thereof. User information may in some cases be selected from the group consisting of driver's calendar information, passenger's calendar information, smartphone information, Google-Now information, historical use information, and combinations thereof.

External information may in some embodiments be selected from the group consisting of information acquired from emails on user's wireless communication device, information acquired from texts on user's smartphone, and combinations thereof. Traffic information may in various embodiments be selected from the group consisting of traffic conditions, road conditions, construction conditions, detour conditions, and combinations thereof. Calendar information may in some cases be selected from the group consisting of day of the week, month of the year, holiday information, and combinations thereof, optionally in combination with a user specified performance level, and combinations thereof. Calendar information may in some cases be selected from appointments or reminders included in an electronic calendar associated with a user of an electric vehicle. Charging equipment availability information may be selected from the group consisting of availability of charging equipment at vehicle's current location, availability of charging equipment at vehicle's expected destination, and combinations thereof, optionally in combination with a status of an additional transportation provider and/or a status of an additional transit option, and combinations thereof.

In a number of embodiments, the plurality of input parameters may be selected from the group consisting of inputs that are personal to a user/vehicle, inputs that are generally applicable, inputs that are historical, inputs that are current, inputs that are sensed, inputs that are referenced, and combinations thereof. In various embodiments, a particular subset of input parameters may be used, as described and claimed herein.

The heating lead time may be longer in some cases, for example at least about 1 minute, at least about 2 minutes, at least about 5 minutes, at least about ten minutes, at least about 15 minutes, at least about 30 minutes, etc. In some cases the heating lead time may have an upper limit, for example about 1 hour or 2 hours.

In a number of embodiments, the system further includes a heating device for heating the battery. The system may also include a data storage device, for example for storing information selected from the group consisting of vehicle use, battery heating characteristics, battery performance as a function of temperature, and combinations thereof. The system may further include a temperature sensor for determining an ambient temperature in proximity to the battery. The system may also include a device for comparing and/or analyzing various types of information. In one embodiment, the device compares and/or analyzes at least one of past predicted start times with respect to actual start times, predicted probability of start times with respect to actual probability of start times, and combinations thereof. Alternatively or in addition, the device may compare and/or analyze predicted/actual drive locations and/or predicted/actual heat power ratings, etc. The device that performs this comparison/analysis may be the same as the module described above.

In a number of embodiments, the signals cause a heat emitting element to emit heat so that the battery heats to the minimum heat level required for a performance level predicted by the module and/or selected by the user.

In another aspect of the disclosed embodiments, an apparatus for controllably pre-heating a vehicle battery device, the apparatus including at least one temperature sensor for determining a temperature of a battery in a vehicle, the battery being a secondary battery; at least one receiver for receiving at least one of a plurality of input parameters; a module configured to send control signals to either the battery or a heating device, wherein the signals result in heating of the battery to temperatures optimized for a predicted vehicle use; wherein the module determines the temperatures optimized for the predicted vehicle use and a heating lead time of at least a minute or more based on the determined temperatures and at least one of the plurality of input parameters. In certain embodiments, the apparatus may include various features as described herein with respect to the system.

In another aspect of the disclosed embodiments, a method for secondary battery thermal management in a vehicle is provided, the method comprising: determining a temperature of a battery and optionally the ambient air temperature; analyzing a plurality of input parameters; providing or determining a vehicle start time and probability of correctness; providing a control signal to either the battery, or a heating device, to heat the battery dynamically to temperatures optimized for a predicted vehicle use; wherein the control signal comprises a heating power rating and a heating lead time of at least a minute or more based on the determined temperatures and at least one of a plurality of input parameters; optionally comparing vehicle start time probability of correctness with the actual vehicle start time, and adjusting an algorithm for providing the vehicle start time; thereby providing thermal management for the battery.

In various embodiments, the plurality of input parameters are selected from the input parameters listed above and throughout the specification.

These and other features will be described below with reference to the associated drawings.

BRIEF DESCRIPTION OF THE DRAWINGS

FIGS. 5A-5F illustrate various confidence levels that a drive will begin at relevant times based on different input parameters.

DETAILED DESCRIPTION

In the following description, numerous specific details are set forth in order to provide a thorough understanding of the presented embodiments. The disclosed embodiments may be practiced without some or all of these specific details. In other instances, well-known elements have not been described in detail to not unnecessarily obscure the disclosed embodiments. While the disclosed embodiments will be described in conjunction with the specific embodiments, it will be understood that it is not intended to limit the disclosed embodiments.

As used herein, the phrase "type of drive" refers to the location, and velocity-related conditions associated with the drive, such as start location, end location, route taken, power level needed to drive at relevant velocities (e.g., power levels for minimum safe driving, urban driving, highway driving, enthusiast driving, etc.), GPS information and geography of the route, traffic information during expected time of the drive, availability of charging equipment at the beginning and end of drive, and other related metrics.

As used herein, the phrase "historical information" refers to information that is based on past conditions, such as when a user has previously used a vehicle, where the vehicle has been driven and at what performance levels the vehicle has been driven. Other examples of historical information relate to historical conditions such as traffic conditions, weather conditions, etc. Historical information may be binned and analyzed in any appropriate way including annually, monthly, weekly, and daily/hourly.

As used herein, the phrase "feedback" includes a comparison of the predicted level of heating or performance to the actual level of heating or performance and optionally an adjustment of the system so that the subsequent predictions better match the actual levels. In various embodiments, machine learning techniques may be applied to carry out this comparison and improve future predictions.

Pre-Heating a Battery

As noted in the Background section, many batteries exhibit poor power performance at low temperatures. This power performance issue is especially relevant in the context of high energy density battery materials. Poor low temperature performance can be unsafe, for example, when merging an electric vehicle onto a freeway. If the vehicle does not have sufficient power from the battery, the vehicle may not be able to get up to a proper merging speed. Poor low temperature performance can also be undesirable to consumers when high performance vehicle characteristics, for example for pleasure driving or vehicle contests, are desired.

Figure 1A:
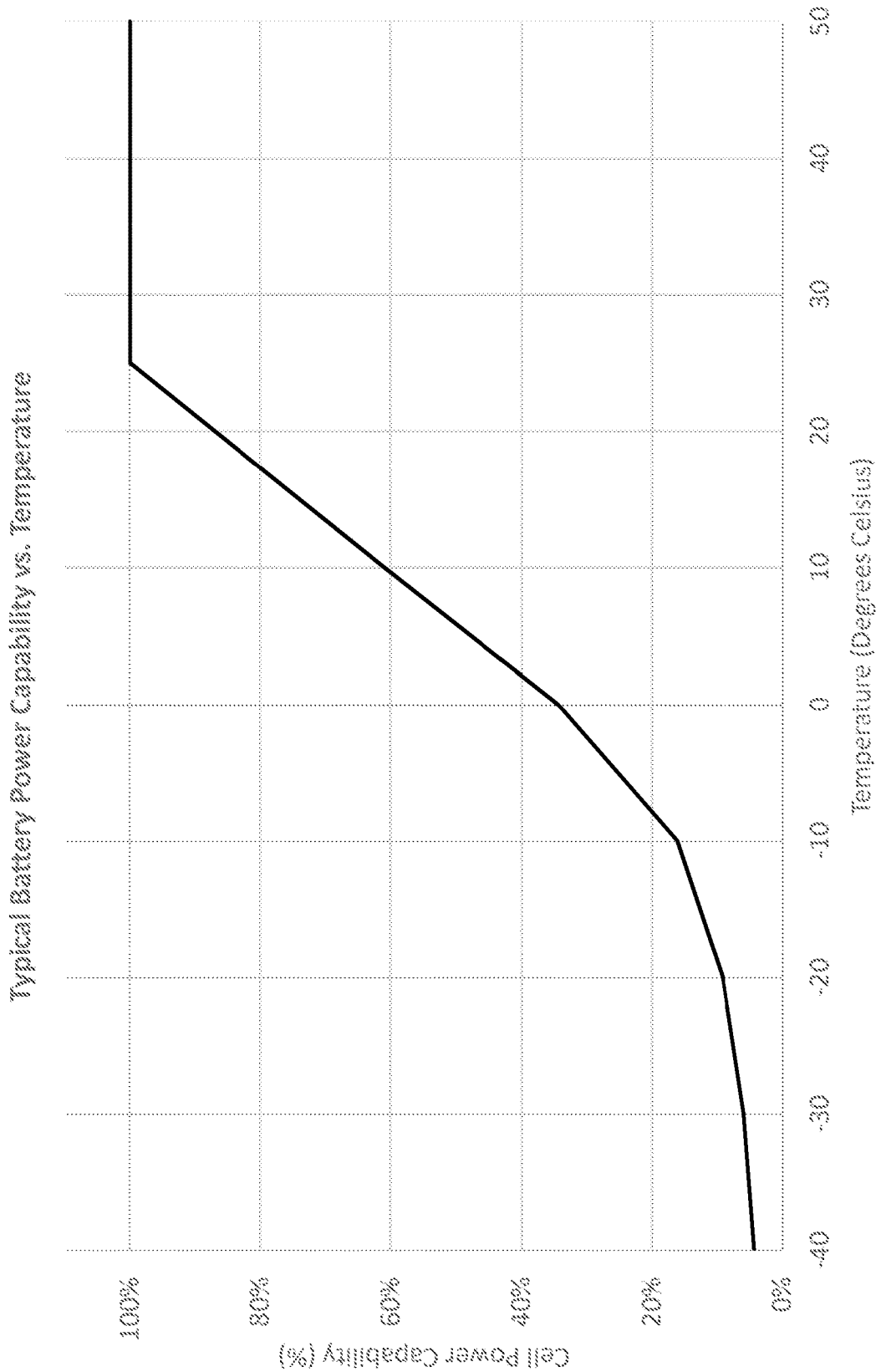
FIG. 1A presents a chart showing cell power capability for various temperatures for a typical lithium-ion battery.

FIG. 1A presents a graph illustrating the cell power capability vs. temperature for a typical lithium battery. The cell power capability is reported in terms of a percent, where 100% means that the battery is operating at its maximum power level. In this example, the full power is not available until the battery reaches a temperature of about 25° C. At a temperature of about 0° C., only about 35% of the power is available, and at a temperature of about −20° C., only about 10% of the power is available. Although the particular values differ for different battery designs, the large decrease in power capability at low temperatures (e.g., below about 0° C.) is common.

Consequently, original equipment manufacturers (OEMs) often provide more power and/or capacity in the battery system than is required during most temperature conditions, so that the battery also performs well in certain low temperature conditions. Such designs unnecessarily add cost, weight, and volume to the powertrain of an electric vehicle. For example, a typical battery cell for an electric vehicle may be capable of peak power of at least about 5 times its energy rating above −20° C., but only about 0.5-1.0 times its energy rating at −20° C. Thus, a 24 kWh battery system for an electric vehicle would provide on the order of 12-24 kW of peak power at −20° C. If the minimum level of power required for safe driving is set at 30 kW (common for electric vehicles, though this threshold could vary), such a vehicle might not be safely driven at all without pre-heating the battery to some degree.

Vehicles need various power levels for driving, but typically over 90% of drivers drive no more aggressively than EPA's standard US06 driving cycle. A typical vehicle needs peak power of around 80 kW to complete the cycle. As an example, a 24 kWh battery system per above would have to be at a temperature of over 5° C. to have sufficient power for the US06 cycle. If battery cells were at a temperature below 5° C., the vehicle would not provide sufficient power to drive the cycle. Even if battery cells are at a relatively warm temperature of 10° C. or 15° C., it's often desirable to warm the battery cells further to 20° C. or above to enable full power capability of 120 kW.

One method for addressing the low power output at low temperatures involves pre-heating the battery, which raises the temperature of the batteries before the vehicle is used for driving. Raising the battery temperature before use allows the batteries to operate in the higher temperature/improved power capability region shown in FIG. 1A. Pre-warming also allows for the use of lower cost, higher energy density, lower power cells (i.e., low power-to-energy ratio) in the battery system which, in turn, reduces cost, weight, and volume of the battery system without sacrificing performance.

Heating a battery, however, requires energy. It is wasteful to heat a battery for improved performance unless the battery will actually be used once it is heated. Heating a battery also requires time, often on the order of minutes or more. When not connected to an external power source, e.g., a charging station, the rate at which a battery can heat is limited by the battery and the battery heating elements. Certain types of lithium ion batteries typically require several minutes of warming.

Currently known methods for pre-heating a battery are limited in application and do not reliably provide a sufficient lead time (e.g., several minutes or more) for a cold soaked battery system to pre-heat to the desired temperatures associated with full performance, particularly for certain types of drive applications. Example methods for pre-heating are discussed further in the following patents and patent applications, each of which is herein incorporated by reference in its entirety: U.S. Pat. Nos. 6,271,648; 6,624,615; 7,154,068; U.S. patent application Ser. No. 13/879,565, filed Jul. 16, 2011, and titled "METHOD FOR DETERMINING THE RANGE OF A MOTOR VEHICLE"; and P.C.T. Application No. PCT/US2009/001916, filed Mar. 26, 2009, and titled "SYSTEM AND METHOD FOR BATTERY PRE-HEATING."

Most known methods fail to heat batteries to a sufficiently hot temperature by the time the batteries are actually used because the pre-heating is not initiated with a sufficient lead time. Furthermore, it would be wasteful to expend energy unnecessarily and heat a battery too far in advance of an actual drive and then maintain this level of heating until an actual drive occurred.

Certain methods for pre-heating electric vehicle batteries are based on the proximity of a user to the battery. However, these methods only provide seconds of warm-up time, which is insufficient to significantly warm the battery for particular performance conditions by the time the battery is actually used. Some methods have been proposed to predict drive start times using statistical analysis of repetitive drives. However, these methods are also insufficient in that they don't provide sufficiently long lead times or have relatively low probability of success. This low success level is due to the fact that many drives are not repetitive, and that even repetitive drives may vary. Thus, these methods frequently result in false predictions, wasted energy, and insufficient lead times. Also, a battery heated above ambient temperature will lose energy due to radiative heat loss, and such loss is wasteful up until the time when the battery is actually used. Furthermore, energy used to heat beyond the battery's optimal temperature is wasteful. Wasted energy from the aforementioned early or excessive pre-heating ultimately results in wasted cost (e.g., when the battery is plugged into a charging station) and limited driving range (e.g., when the battery is not plugged in and the battery supplies the energy for pre-heating).

As such, a problem exists in the secondary battery field related to predictively pre-heating a battery so that a desired battery temperature and associated battery performance is achieved when the battery is actually used, and so that power is not wasted unnecessarily. Another problem exists related to dynamically heating a secondary battery so that the battery operates at relevant (and changing) levels of performance during a drive, e.g., initial start and also five minutes into a particular drive. Another problem exists related to methods and systems for accurately predicting whether, when, and how much to pre-heat a battery, where the pre-heating begins several minutes or more in advance of the battery's use.

Pre-heating can be beneficial for various battery types including conventional insertion-type lithium-ion batteries as well as newer high energy density battery materials. Area specific resistance (e.g., resistance at the interface between cathode active material and electrolyte) and bulk conductivity are both a function of temperature. Pre-heating is particularly important for certain solid-state lithium ion rechargeable batteries because of conductivity limitations of solid state electrolyte and/or lower surface area interfaces (e.g., a planar interface between a cathode and solid state electrolyte) that may result in cell power limitations, especially at cold temperatures. High energy density battery materials using conversion materials, and methods of manufacturing such materials and fabricating them into batteries are further discussed in the following Patents and Patent Applications, each of which is incorporated by reference in its entirety: U.S. patent application Ser. No. 14/207,493, filed on Mar. 12, 2014, titled "IRON, FLUORINE, SULFUR COMPOUNDS FOR BATTERY CELL POSITIVE ELECTRODES"; U.S. patent application Ser. No. 13/922,214, filed on Jun. 19, 2013, and titled "NANOSTRUCTURED MATERIALS FOR ELECTROCHEMICAL CONVERSION REACTIONS"; U.S. patent application Ser. No. 14/146,728, filed Jan. 3, 2014, and titled "THIN FILM LITHIUM CONDUCTING POWDER MATERIAL DEPOSITION FROM FLUX"; and U.S. patent application Ser. No. 14/221,957, filed Mar. 21, 2014, and titled "METHOD FOR FORMING METAL FLUORIDE MATERIAL."

Various embodiments herein relate to methods for predicting whether, when, and how much to pre-heat a battery. The methods may be used to predictively heat a battery with at least a minute of lead time. In some cases a lead time is at least about 1 minute, at least about 2 minutes, at least about 5 minutes, at least about 10 minutes, at least about 15 minutes, at least about 30 minutes, or at least about 1 hour. An optimal lead time will depend on the instant conditions when pre-heating occurs. The methods may use various input parameters for determining whether or not to pre-heat at a given time. Generally speaking, the methods involve determining a likely vehicle start time and an associated level of confidence that a drive will start at that time, determining a probability threshold at which pre-warming should occur, and performing pre-warming if the determined confidence level is greater than the determined probability threshold. The methods may also involve predicting the level of power that is required for a predicted drive and pre-warming the battery to a temperature that enables the battery to operate at the level of power predicted to be required, such that the battery is heated to an optimal temperature at the predicted start time.

Figure 1B:
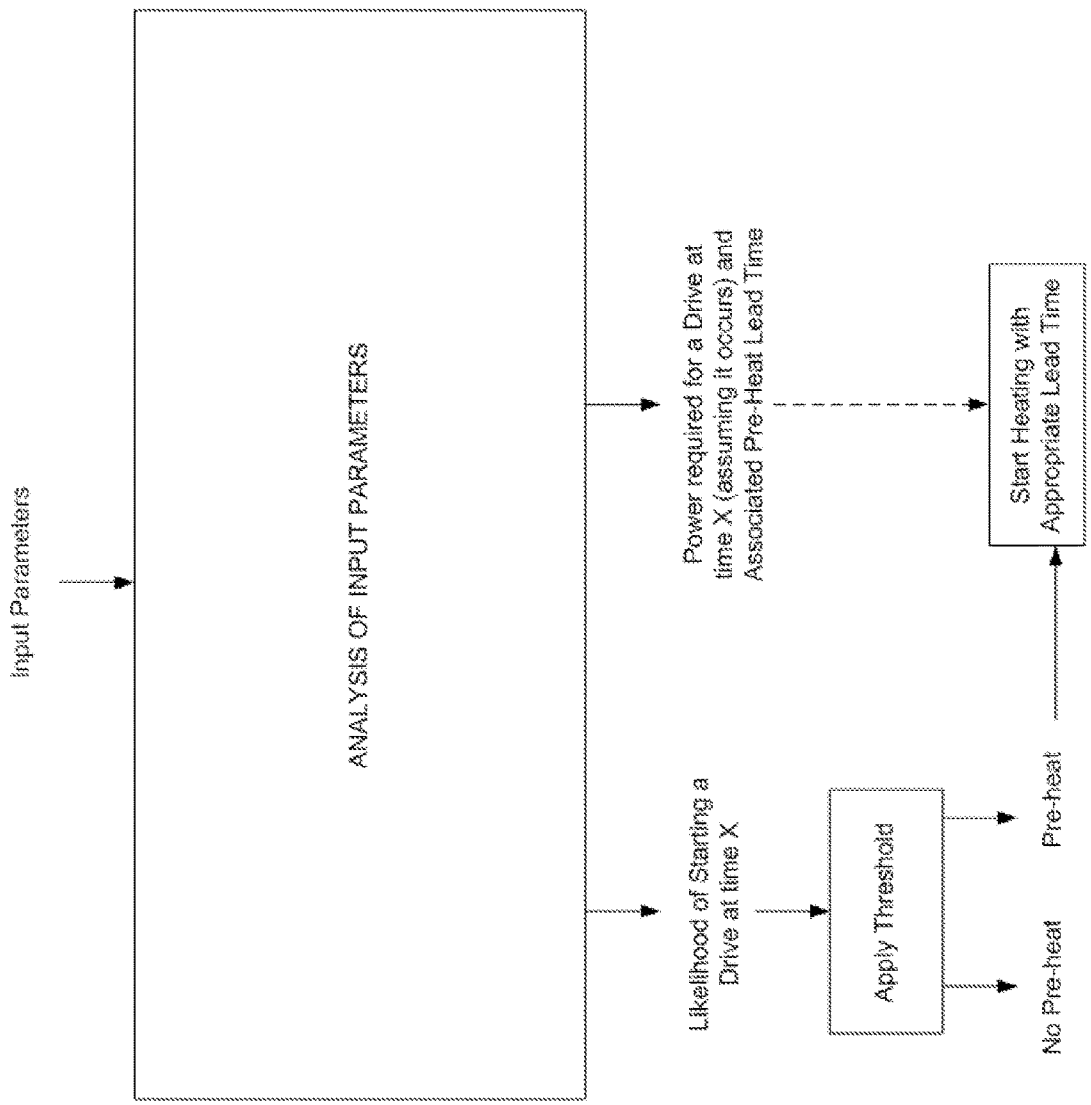
FIG. 1B depicts one example of a pre-heating prediction process.

FIG. 1B depicts one implementation of a pre-heating prediction process. Various input parameters are analyzed to predict the likelihood of driving at a particular time (e.g., an expected start time). This likelihood is often referred to herein as the confidence level. The input parameters are also used to determine the power required for an expected drive at the particular time (assuming such drive occurs), as well as an associated pre-heating lead time. The lead time is based on the power required (which determines a desired final temperature after preheating) and the current temperature of the battery, as well as battery characteristics such as the heat capacity of the battery materials. A probability threshold may be statically defined or calculated based on the input parameters. The probability threshold is applied against the determined likelihood of starting a drive at the particular time. If the likelihood of driving (i.e., confidence level) meets or exceeds the probability threshold, a decision to pre-heat is made. The pre-heating parameters are controlled based in part on the power predicted to be needed for the drive, as noted above. If the likelihood of driving is lower than the probability threshold, a decision to not pre-heat is made, and no further action is taken at that time.

A number of options are available for pre-heating the battery, and the embodiments herein are not limited to any particular heating method. In some examples, the battery heats itself internally by discharging stored energy to another sink of electrical energy, and generating heat internally through the battery's internal resistance. This method is particularly effective at low battery temperatures, when the battery requires the most heating.

In these or other examples, the battery may provide electrical power to an external heating element, such as an electrical resistance heater, and the battery is heated by direct thermal contact with the heating element, or indirectly by thermal contact with another fluid or object heated by the heating element. A fluidic heat exchange system may be used in some cases.

In some examples, the battery is heated, directly or indirectly, by heat emitted from a combustion engine of a plug-in hybrid vehicle. Such heating may be particularly useful for raising the temperature of a battery while driving. This may be beneficial where an initial portion of the drive requires low power (e.g., using surface streets to drive toward the highway) and a later portion of the drive requires higher power (e.g., driving on the highway). Other methods of heating or cooling a battery are set forth in the following Patent Applications, each of which is herein incorporated by reference in its entirety: International PCT Patent Application No. PCT/US2015/010179, filed Jan. 5, 2015, and titled "THERMAL MANAGEMENT SYSTEMS FOR VEHICLES WITH ELECTRIC POWERTRAINS"; International PCT Patent Application No. PCT/US14/61761, filed Oct. 22, 2014, and titled "THERMAL AND ELECTRICAL CONNECTIONS FOR BATTERY SYSTEMS"; and U.S. Nonprovisional patent application Ser. No. 13/763,636, filed Feb. 9, 2013, and titled "BATTERY SYSTEM WITH SELECTIVE THERMAL MANAGEMENT."

In certain examples, the battery provides electrical power to a device, such as a compressor, which drives a thermodynamic cycle and generates heat that is used to heat the battery, directly or indirectly by thermal contact with another fluid or object.

In some examples, the battery is heated by energy sourced from another energy storage system or another source of electrical power in the vehicle or outside the vehicle, and directed to a heater. Examples of such energy storage systems and sources of electrical power may include an additional battery, a plug-in station, and the like.

In certain cases, a heater of 3-15 kW, for example 5-10 kW may be utilized in a battery system for use in warming the battery before or during driving. In some examples, the battery is heated by any combination of the above methods.

The disclosed methods are applicable to any battery that requires pre-heating for improved performance. Many solid state batteries should be at least about 10° C., or at least about 15° C., or at least about 20° C. to perform well (e.g., at full power), and thus benefit from pre-heating when the batteries are cooler than these temperatures. These methods are applicable to battery cells, batteries, battery packs, and collections of batteries and battery packs. In some solid state batteries, such as those having conversion active material cathodes, the batteries should be at least about 10° C., or at least about 15° C., or at least about 20° C., or at least about 30° C., or at least about 40° C., or at least about 50° C., or at least about 60° C., or at least about 70° C., or at least about 80° C., or at least about 90° C., to perform well.

The disclosed methods may be used with any type of batteries. The methods are most useful when used in the context of high energy density batteries. In some cases the batteries have an electrode material characterized by an operating temperature between about −40° C. to about 120° C., or an operating temperature of about 80° C.; or an operating temperature of about 60° C.; or an operating temperature of about 30-60° C.

Setting a Driving Probability Threshold

As noted above, various methods disclosed herein involve predicting/determining the time at which a vehicle is expected to start being driven, determining the confidence level that the vehicle will be driven at the expected start time, determining a probability threshold, and pre-warming the battery to a desired level if the confidence level that the vehicle will be driven at the expected start time is greater than the probability threshold. Both the confidence level that the vehicle will be driven at a particular time and the probability threshold (as well as the optimal pre-heating temperature and lead time) can vary over time based on various input parameters. Higher probability thresholds mean that pre-warming is less likely to occur for any given set of inputs.

One input parameter that can be a factor in determining the probability threshold is whether or not the vehicle is plugged in to an external power source. When a vehicle is plugged in, there is less concern about wasting energy by heating the battery when such heating is not ultimately needed. Conversely, when a vehicle is not plugged in, energy waste is a larger problem. When not plugged in, any heating that occurs drains the energy available in the vehicle (e.g., draining the battery or other energy storage system heating the battery). If the battery is unnecessarily heated a number of times before it is driven, the vehicle will have less energy available when the vehicle is finally driven, thus limiting the distance that can be driven using the remaining electric power. As such, the determination of the probability threshold may take into account whether or not the vehicle is plugged in. If the vehicle is plugged in, the probability threshold may be determined to be relatively lower. The lower probability threshold means that it is more likely that pre-warming will occur for any given set of inputs. Similarly, if the vehicle is not plugged in, the probability threshold may be determined to be relatively higher, making it less likely that pre-warming will occur for a given set of inputs.

Another input parameter affecting the determined probability threshold is the state of charge (SOC) of the battery.

When a battery has a low SOC, there is relatively little energy available for pre-heating the battery, assuming that heating occurs through battery discharge, and it is more important to conserve remaining energy for driving. As such, if a battery has a low SOC, the probability threshold may be determined to be relatively higher. Conversely, when a battery has a high SOC, there is more energy available, and it is less important to conserve the remaining energy for driving. Thus, if a battery has a high SOC, the probability threshold may be determined to be relatively lower. Because the battery may be losing power as the battery is (repeatedly) pre-heated, the SOC can change over time. Thus, the probability threshold may also change over time as the SOC changes. In one example, a battery starts fully charged and the probability threshold begins relatively low. As the battery repeatedly pre-heats without being driven (in part due to the low probability threshold), the battery loses energy and the SOC is reduced. In response to the decreased SOC, the probability threshold may be raised and pre-heating may be less likely to occur as the battery continues to pre-heat and drain. Eventually the battery may reach a sufficiently low SOC that the probability threshold is raised above the confidence level. At this point, pre-heating ceases to occur and the remaining battery charge is conserved.

The amount of time before an upcoming predicted drive may also affect the probability threshold. If it is determined that the next likely drive will not occur for a day or more, for example, the probability threshold may be determined to be relatively higher in order to avoid wasting energy pre-heating the battery again and again. Conversely, if it is determined that the next likely drive will occur within a shorter period, e.g., hours, the probability threshold may be determined to be relatively lower. Where a predicted upcoming drive is imminent, there will be less energy wasted because the battery isn't repeatedly heated over a long period of time. A separate threshold may be set for determining when the next "likely" drive will be in determining the length of time until the next upcoming likely drive. The likelihood of driving (e.g., the confidence level that a drive will occur at an expected start time) may be determined as set forth below.

Another factor that can affect a determined probability threshold is the length of an expected drive, which may be determined using the methods and inputs described further below. Where a longer drive is expected to occur, more power should be conserved for the drive, and less power should be consumed predictively pre-heating the battery. As such, if it is determined that an upcoming drive is long (e.g., requiring a substantial amount of the energy in the battery), the probability threshold may be determined to be relatively higher. Conversely, if it is determined that an upcoming drive is short (e.g., requiring only a small portion of the energy in the battery), the probability threshold may be determined to be relatively lower.

Similarly, the type of drive expected and the resulting amount of pre-heating needed to bring the batteries to a temperature allowing such a drive can affect the probability threshold. Where an expected drive involves only city driving or other relatively low power driving, relatively less heat will be used to bring the battery up to a temperature that permits the battery to deliver such power. Because less heat/energy is needed to pre-heat the battery to the required temperature, it is less problematic to pre-heat unnecessarily. As such, if it is determined that an upcoming drive will require relatively low power, the probability threshold may be determined to be relatively lower. Conversely, if it is determined that an upcoming drive will require relatively higher power (e.g., if it is expected that the vehicle will be driven on the highway soon after starting), the probability threshold may be determined to be relatively higher.

Similarly, the location at which the vehicle is parked can affect the probability threshold, which may be determined using the methods and inputs described further below. When the vehicle is parked at a location where the duration between drives is typically longer (e.g., an airport, train station, bus station), the longer span of time means energy of the battery lost to self-discharge will be cumulatively higher. In addition, the multiple false predictions within the long duration between drives risks leaving the battery with less energy than is desired for the next drive. Consequently, the probability threshold may be determined to be relatively higher.

User preferences can also affect the probability threshold. Some drivers are more energy conscious and would prefer to avoid wasting energy or being left with insufficient energy to make a drive. Other drivers are more performance conscious and would prefer to have a vehicle that is ready to go the moment they want to drive. In certain cases a driver may input their preferences into a system that controls whether or not pre-heating occurs. Such preferences may be input using a user interface in/on the vehicle, on a smart phone, tablet, computer, etc. In some cases such preferences can be stored in a user ID/profile that is associated with a particular user (and which may be transferred between different vehicles). Information associated with the user ID/profile may be stored in a variety of locations as discussed elsewhere herein. As used herein, storage of information includes physical and electronic (e.g., RAM, SIM card, computer memory) storage of information using currently available information storage technology. The preferences may be specified using a sliding scale between energy conservation/storage and immediate power/performance, or other related preferences. In another example a user may individually rate the perceived importance of energy savings/storage and performance (or related preferences) without presenting them as a sliding scale/tradeoff. In some embodiments a user may set such preferences for different conditions. For instance, a user may set different preferences for when a vehicle is plugged in vs. when the vehicle is not plugged in, or when the battery has at least a minimum amount of energy vs. when the battery has less energy, etc. Such preferences can then be used when determining the probability threshold. If, for example, a user indicates that they strongly prefer energy savings/storage over immediate performance, a probability threshold may be determined to be relatively higher. The higher probability threshold will make it less likely that energy is wasted on pre-heating the battery when it isn't used. On the other hand, if a user indicates that they prefer immediate performance, a probability threshold may be determined to be relatively lower. The lower probability threshold will make it more likely that a battery is heated to a desired temperature at any given time.

The price of electricity may also factor into the determination of the probability threshold. When electricity prices are higher, wasted energy is more of a concern and the probability threshold may be determined to be relatively higher. Conversely, when electricity prices are lower, unnecessary heating is less costly and therefore less of a concern, making a relatively lower probability threshold more beneficial.

The probability threshold can be statically or dynamically set to any desired level. A relatively low probability threshold may fall between about 0-30%, a moderate probability threshold may fall between about 30-70%, and a relatively high probability threshold may fall between about 70-100%. These values are provided merely as guidelines and are not in any way limiting.

In some cases the various inputs may be assigned weighing factors that determine how relatively important the various input parameters are. Examples are presented below in the context of determining the confidence that a drive will occur, with reference to Tables 2 and 3. This same method may be used for determining a probability threshold. While weighing factors for inputs can change with implementation and may even be updated dynamically based on current data, many inputs tend to affect the probability threshold in predictable ways. Table 1 below lists one example of the expected relative weight that such inputs may individually have on a probability threshold for a variety of available inputs.

TABLE 1

| | Input | | | | | |
|---|---|---|---|---|---|---|
| | Current charging status Vehicle plugged-in | Predicted drive type: known destination with charger | Predicted drive type: long distance drive | Current SOC: relatively low | Current battery temperature: relatively low | Location: place of travel (e.g., airport, train station, etc.) | Current electricity price: high |
| Relative effect on probability threshold | 1 | 2 | 3 | 3 | 2 | 4 | 3 |

4-Highest
3-High
2-Low
1-Lowest

Determining the Expected Drive Start Time and Confidence Level

The instant disclosure provides methods for determining whether, when, and how extensively to heat the battery so that the battery is pre-heated if the probability of an upcoming drive (e.g., the confidence level for a particular expected start time) is determined to be above the probability threshold. The disclosed methods utilize new inputs and combinations of inputs to determine the probability that a drive will occur. As such, the disclosed methods may be used to predictively pre-heat a vehicle battery with at least one minute or more of lead time and a high degree of accuracy. By using the disclosed inputs and combinations of inputs, the methods can predict whether and when a drive will occur with a high degree of correctness. This helps minimize wasted energy used to pre-heat the vehicle battery unnecessarily.

Figure 2:
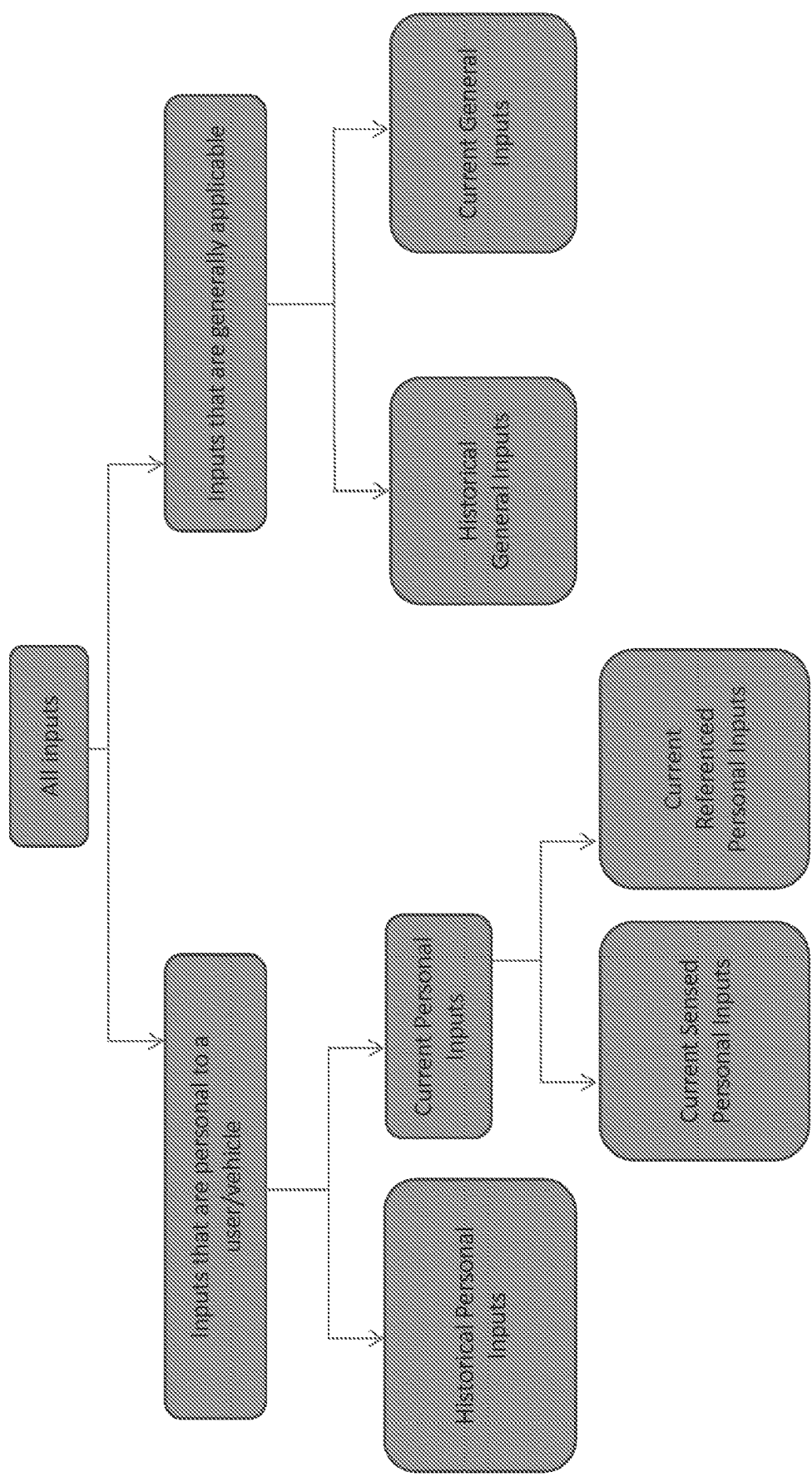
FIG. 2 illustrates one categorization of various input parameters that may be used.

FIG. 2 presents various categories into which the individual input parameters may fit. Different categorizations may also be used. First, the inputs may be categorized between those that are personal to a user/vehicle and those that are generally applicable to many people. Inputs that are generally applicable may be categorized between historical general inputs and current general inputs. Inputs that are personal to a user/vehicle may be categorized between historical personal inputs and current personal inputs. Inputs that are current personal inputs may be categorized between current sensed personal inputs and current referenced personal inputs.

Examples of historical general inputs include, but are not limited to, historical traffic information (e.g., traffic over expected routes, for particular days of the week and times, for particular holidays, for particular weather conditions, etc.), historical weather data (e.g., annually-based and daily/hourly-based weather information, including temperature, precipitation, and visibility), etc. Examples of current general inputs include, but are not limited to, current traffic data (e.g., live traffic over expected routes, construction data, detour data, etc.), current weather data (e.g., temperature, etc. in a region where the vehicle is located), general calendar data (e.g., day of the week, whether or not it is a holiday, etc.), and electricity prices.

Generally speaking, inputs that are generally applicable would be relevant to anyone in the same general region as a driver. In some cases a user's particular route may factor in (e.g., traffic data over various routes); however, the traffic data is still generally applicable to many people. On the other hand, inputs that are personal to a user/vehicle may only be relevant for that user or vehicle. For some predictive heating conditions, such as those which rely on analyzing large data sets of multiple users, and as described below, some individual user data may be relevant to other users that are embraced by the same data set or demographic.

Examples of historical personal inputs include, but are not limited to, past driving data for a user or vehicle (e.g., all driving history including drive start times, drive durations, drive routes, destinations, starting locations, driving tendencies (e.g., speed, aggressive vs. non-aggressive, typical acceleration, etc.), drive types (e.g., city vs. highway), etc.), battery characteristics (e.g., energy capacity, self-discharge rate, power vs. temperature vs. state of charge vs. age relationships, thermal time constant), battery warming characteristics (e.g., heat capacity of battery materials and related properties, past warming conditions and results, etc.), properties of an available heater (e.g., capacity and efficiency), vehicle characteristics (e.g., vehicle powertrain characteristics (e.g., type of powertrain (e.g., electric, plug-in hybrid, hybrid), thermal system configuration, motor power, powertrain efficiency, vehicle specific minimum power output levels for safe driving)), and destination information (e.g., specific GPS coordinates refer to an airport, presence of charging infrastructure), etc.

While historical personal inputs are generally based on information that relates to past conditions, current inputs generally relate to current or future conditions, and in some cases may be accessed on-the-fly. As noted above, current personal inputs may be categorized between current sensed personal inputs and current referenced personal inputs. Sensed inputs may be generated by one or more sensors including, but not limited to, GPS or other positioning sensors, thermometers, etc. In some cases the sensed data is referenced from another source that senses the relevant data itself. One example is temperature data generated by a thermometer, such data being published by an online weather company and referenced by a battery system of a vehicle as an input in determining whether to pre-heat.

Examples of current sensed personal inputs include, but are not limited to, the current temperature of a battery (e.g., from a thermometer or other sensor), the battery state of charge, the current temperature of a vehicle (e.g., from a thermometer or other sensor, or from a current weather report/site/database), the current location of a vehicle (e.g., from a GPS or other sensor), the current location of a user or users (e.g., from a GPS or other sensor, for example on a cellular phone, tablet, key fob, camera (e.g., at work, home, etc.), or other electronic device or combination of devices), the proximity of a user to a vehicle (e.g., from a combination of GPS, vehicle camera, infrared, or other sensors), the location of a user with respect to particular locations (e.g., whether or not the user is at home, work, grocery store, gym, airport, etc., which may be sensed through a GPS or other sensor integrated into any device carried by a user), whether the vehicle is currently connected to an external power source (e.g., a charger), etc.

Examples of current referenced personal inputs include, but are not limited to, user instructions and preferences (e.g., a user profile detailing a user's various driving preferences, which may be changed by a user as they please), a user's calendar/schedule and their upcoming commitments (e.g., such data may be pulled from a user's electronic calendar, email messages, text messages, Google Now data, etc.), transportation provider status (e.g., flight, train, bus, ship arrival time), etc.

In some embodiments, information related to "smart home" devices may be used as an input. Such information may be collected from various types of internet-connected devices. In one example, a smart alarm clock may provide information about when the user wakes up, which may factor into a prediction about when an upcoming drive will occur. Similarly, information from kitchen appliances such as coffee makers or entertainment system components such as radios and televisions may indicate that a driver is awake and preparing to drive. In another example, a smart refrigerator may sense that the refrigerator is empty. The prediction methods may be used to determine that each time the fridge is empty at 10 a.m. Saturday, there is a high probability that a user will go to the grocery store. Any available data may be used. Such data may be considered sensed or referenced, depending on what the data relates to and how it is collected.

Any combination of available data may be used. The use of additional inputs may increase the accuracy of the predictions.

As noted, one type of input that may be used to predict a start time and evaluate the confidence level that a vehicle will be driven at the expected start time is data originating from a user's electronic devices and/or profiles/stored information. This data often provides a very accurate indicator of when pre-heating is likely to be needed. For instance, if a user has a soccer match scheduled in their Google Calendar for 10 a.m. on Saturday at Park Arena and it takes 20 minutes to drive from where the vehicle is located to the Park Arena, the system can determine that pre-heating is likely to be required such that the vehicle is ready to drive at 9:40 a.m. that Saturday. In another example, the system takes numerous users into account including, for example, both a driver and any number of passengers. The driver and passengers' calendar data (and location data, etc.) may be used together to determine the probability of driving at a given time. In a particular case, the system takes into account driver and passenger locations based on GPS or other signals from the driver and passengers' cellular phones or other electronic devices.

Similarly, the proximity of a user (or multiple users) to a vehicle can be used as an input. The proximity may be sensed based on any one or more of the location of a key, fob, GPS signals, Wi-Fi signals, Bluetooth signals, etc. In certain cases this information may be combined with other inputs, for example where a vehicle (or battery system, in general, including any on-car and off-car information storage components) contains information about the likely next trip start, duty cycle, and confidence threshold for warming. In some examples, a cell phone automatically sends a vehicle/battery system a signal such as, but not limited to, a text message, when the cell phone approaches the location of the vehicle. The signal may be sent by Wi-Fi or cellular signals, or the like. GPS and related location services may be used to determine when a cell phone approaches the location of the vehicle.

In another example, the vehicle communicates with cell phone towers and is notified when a relevant cell phone is within range of the nearest tower or towers. In another example, a cell phone sends the vehicle a signal or information that helps determine the time or type of the next predicted drive. Such information may originate from various sources such as calendar appointments, Google Now' info, emails with flight information or other information related to commitments, meetings, appointments, trips, plans, etc. The battery pre-heats according to this information. In another example, a cell phone sends an infrared IR signal when the cell phone is nearby that is picked up by vehicle IR cameras/sensors.

Destination information can also be a relevant input. A destination can be used to determine likely driving routes, which can determine the power level needed for driving (and thus the temperature to which the battery should be preheated). For instance, if a user receives a text indicating that they will meet a friend for coffee 30 blocks across town in an hour, a system may predict that it is likely surface streets will be used, and pre-warming may be done to an extent that is sufficient for city driving but not highway driving. In this example, pre-heating to a level sufficient for highway driving is unnecessary and likely to waste energy. Pre-heating will begin at a time that allows the battery to heat to the desired temperature by the time the drive is likely to start. In a similar example, a user may receive a text or email indicating they have an interview scheduled an hour away from the user's home on Monday morning. The system may use this information to determine that highway driving will likely be used based on the distance to the destination and the available routes. In this example it is beneficial to pre-heat the battery to a relatively higher temperature compared to the above example. Here, since highway driving is expected and greater power is expected to be needed, pre-heating will occur to a greater degree. As noted elsewhere herein, the system may determine that pre-heating all the way to a temperature that enables highway-level power is not needed if the expected route will include surface driving prior to the highway driving, where the battery can continue to heat as the vehicle makes its way to the highway.

Another type of input involves traffic information. Where traffic is heavier (in general or along expected routes), driving is likely to be slower and less power is needed. Since less power is needed, the battery can be pre-heated to a relatively lower temperature. Traffic information may be based on real time conditions and/or average or patterned historical traffic data (e.g., patterned data may be based on the time of day and/or day of the week and/or holiday status).

Weather information may also be used, and can relate to current conditions or historical conditions. Relevant weather information can include the actual temperature (e.g., from a sensor, weather service, etc.), as well as any weather factors that can affect road conditions (e.g., whether there is precipitation, the degree of precipitation and its effect on road safety, presence of storms, etc.). Historical weather information (e.g., based on annual and/or daily/hourly weather patterns) may also be used. Temperature is particularly relevant in that the temperature directly factors into how much heating is needed due to heat loss or heat gain driven by the difference in temperature between the battery system and the ambient environment.

In some cases one or more inputs may come directly from a user. For instance, a user can indicate a particular drive start time, driving schedule, driving preferences, etc., which may be used by the system to schedule pre-heating as needed. Such user inputs may occur through any available mechanism, including but not limited to, a user interface implemented on an electronic device such as a computer, laptop, phone, or other electronic device. The user interface may also be on the vehicle itself. In certain cases many user interfaces are available on different devices, and a user can choose to interact with the system using their preferred device. In some cases, a user ID/profile may be used to store information relevant to a particular user, as discussed elsewhere herein. Such user ID/profile may be accessed using the user interface on any of the listed devices. Information provided through a user interface may be sent to and used by a vehicle through any available means. In one example, a user wants the vehicle be at full performance capability in 40 minutes following the early end to her offsite meeting. The user may use a smartphone application to indicate that full performance is desired 40 minutes in the future. The system may then pair this instruction with other inputs such as a current battery temperature to determine how much heating is needed to bring the battery to full performance level. Another input such as a power delivered by a heater and thermal system efficiency/characteristics may then be used to determine how long the pre-heating will take. This duration then determines the time at which pre-heating should begin.

Another factor that can be relevant in predicting whether driving will occur and determining the optimal pre-heating conditions relates to past driving history. A vehicle may log all driving history and use such history to determine the probability that a vehicle will be driven at any particular time. Daily, weekly, and monthly routines may be learned in this way. For instance, a user may drive to work starting between 8:15-8:30 most weeks Monday through Friday. This information can be logged and used to help predict whether and when pre-warming is needed.

Methods of determining confidence levels use input parameters such as those described above as independent variables. The confidence values are dependent variables. The relationship between confidence level and the input parameters may assume many different forms and likewise may be generated by many different tools such as regression techniques, multivariate statistical analysis, and neural networks. The relationship may be linear or non-linear, with linear relationships being represented by simple summations of terms, each containing a product of a single independent variable and a coefficient. In some cases, the coefficients are weighting factors such as those described below in Example 10. Non-linear relationships have some component (e.g., a term) that is not linear. Examples of non-linear components include terms containing a product of two or more input parameters or an input parameter raised to a power other than 1. In some cases, the values of one or more independent variables are bit values (e.g., 0 or 1). In some cases, the values of one or more independent variables are values within a continuous range. The values may be integers, decimal numerals, fractions, etc. The input parameters and confidence levels are set for a particular expected driving time, and they may repeat on a regular schedule such as daily, weekly, annually, etc. For example, some or all input parameter values may reoccur every weekday at 8 AM or every July 4 at noon. Of course, the values may be adjusted based on feedback or other learning as described below.

In some examples, the methods of predictively pre-heating a battery include machine learning. In some examples, the methods of predictively pre-heating a battery include a learning algorithm. These methods include, but are not limited to, machine learning, data-mining, statistical pattern recognition, supervised learning, parametric/non-parametric algorithms, support vector machines, kernels, neural networks, unsupervised learning, clustering, dimensionality reduction, recommender systems, and deep learning. Applications of these techniques using the principles described herein are within the level of expertise of those skilled in the art.

In some examples, the machine learning includes analyzing a set of inputs, generating a prediction directed to at least one of (a) when an upcoming drive will occur, (b) the level of power that is optimal for the upcoming drive, (c) the degree of pre-heating that will result in the optimal level of power, and/or (d) the lead time for achieving the optimal degree of pre-heating/the optimal power level before the predicted time of the upcoming drive, heating the battery as predicted, analyzing the actual use and performance of the battery/vehicle, comparing or assessing the actual use/performance of the battery/vehicle with the predicted use/performance, and generating a new prediction directed to at least one of (a)-(d) with respect to a subsequent predicted drive. In this way, the set of data (and the relationships among such data) that are used to predict when and how much to pre-heat a battery can be continuously updated based on the latest data and relationships. This allows for the battery system to continuously learn from a user (and other available sources), thereby steadily improving its predictive power.

In one example, the machine learning includes analyzing a set of inputs, generating a prediction as to when an upcoming drive will occur and the optimal power level for the upcoming drive, heating the battery as predicted, analyzing when the predicted drive actually occurred and the power that was actually used during the drive (e.g., the max power used, the power vs. time profile over the course of the drive, etc.), comparing or assessing the actual drive time and battery power used with the predicted drive time and battery power, and generating a new prediction as to the timing and/or optimal power level for a subsequent drive.

In many cases, the new prediction reduces the deviation or error between the actual battery performance observed (e.g., the timing of the drive, the battery power used, the amount of pre-heating provided, and the lead time used for pre-heating) and the predicted battery performance. In this iterative fashion, the methods set forth herein allow a battery management system, which may include a computer/processor associated with a battery, to make improved predictions over time, such predictions becoming increasingly accurate as a result of comparing or assessing the differences between predicted pre-heating scenarios and actual heating scenarios. In some examples, the inputs are from a single user and in some examples the inputs are from multiple users. In these or other cases, the inputs may relate to a single vehicle, or to multiple vehicles.

In some examples, inputs from multiple users includes inputs associated with a demographic. For example, a demographic may be defined by people of certain characteristics, such as age, race, education, job type, income level, sex, driving experience, and other characteristics. For example, a demographic may be defined by single men between the ages of 30-35. If this group of men has a characteristic driving pattern, this driving pattern and these inputs from the demographic may be considered when generating a prediction as to when and how much to pre-heat a battery for other users falling with the definition of the demographic. In a similar example, a demographic may be at least partially defined geographically, such that the driving habits of people in a particular geographic region may inform the predictions. As an example, drivers in a given city tend to be much more aggressive than drivers in outlying rural areas of that given city. These differences can help inform the prediction with respect to the optimal power needed for an upcoming drive.

These inputs may also be referred to as big data inputs. Big data, or demographic, inputs include a characteristic selected from, age, geography of user, education of user, geography of drive(s), income of user, job type of user, driving experience of user, location of user, sex of user, and population density for the demographic in a particular region. As an example, big data inputs may include the common driving routes that many delivery persons who deliver commercial packages might take. Since these routes are typical driving routes for delivery persons, but may not be typical driving routes for persons who have jobs not requiring commercial deliveries, this information is relevant as an input for a demographic including delivery persons, but is much less relevant as an input for a demographic that is not specific to delivery persons, or which excludes delivery persons.

Inputs can include a variety of information including demographic information as well as other information. In various cases, the information could include employment information. The employment information may include information selected from the type of employment, the annual income, the type of job (e.g., service, legal, medical, professional, nonprofessional, labor, etc.), employment status (e.g., employed, unemployed, employed full time, employed part time), and shift/scheduling information (e.g., day shift, evening shift, night shift, split shifts, etc.). The information may include the vehicle information that pertains to a single user or to a demographic of users. For example, if a demographic is defined by taxi cab drivers, then the relevant other information may include the type of vehicle that taxi cab drivers use for taxi services. Similarly, if a demographic is defined by sports enthusiasts, then the information may include the types (e.g., make, model, body type, etc.) of vehicles commonly used by sports enthusiasts (in many cases high performance vehicles). The vehicle information may also relate to the particular vehicle that is being driven, and may include the type of vehicle, the performance characteristics of the vehicle, the make of the vehicle, the model of the vehicle, and the year the vehicle was manufactured. The information may include the geography where the vehicle is located or the geography where the vehicle is driving towards. The information may include the location of the vehicle, the location of the user, and/or the location of the users defining a demographic that is considered in a predictive pre-heating scenario. The information may include past driving uses, past insurance claims, and other historical information which is indicative of the driving history of a particular user or demographic.

In some examples, a demographic may be defined by (or include information about) certain associations which members of the demographic commonly have. These associations can include, but are not limited to, memberships, club privileges, societies, subscriptions, and interests of the users in the demographic. In one example, an "enthusiast driver" demographic may be defined to include everyone who is subscribed to one or more services (e.g., magazine subscription, blog following, etc.) to driving-related media.

In some examples, the information about a user that is analyzed and used to generate a prediction as to when and/or how much to pre-heat a battery, may be stored in a variety of locations. For example, the information about a user's driving history may be stored on a memory device physically attached to the vehicle. Alternatively or in addition, the information may be stored in a cloud, or remote server, or a computer, including a smart phone other portable device, remotely associated with, or wired to, a battery. This remotely stored information could be made accessible to a vehicle by a Bluetooth, Wi-Fi, or an internet-based connection. This remotely stored information could be used by a user in a vehicle other than the vehicle which a user typically drives. For example, if a user travels to a new location and rents or shares a vehicle, this rented or shared vehicle can download or access a users' profile to capture the user's historical driving information (and any other available information) and make a prediction as to when and how much to pre-heat a battery in the rental or shared vehicle. The pre-heating prediction for the rental vehicle can be based on driving and other information generated before the user even enters the rental vehicle. Such information may include the driving history of the user in their primary vehicle, as well as any other available information related to the user. As the user continues to drive the rental car, the information can further include the driving history for the user in the rental car. Similar considerations may come into play when a user drives a loaner car (e.g., from a mechanic or friend), a car sharing car (e.g., through Zipcar and similar companies), etc. Information relevant to making a prediction about pre-heating a battery can be stored in a variety of locations such as, but not limited to, a portable memory device, a portable memory RAM chip that can be carried with the user (e.g., in a wallet or other purse and less than about 20 square inches area), a portable computer or tablet, a cloud, a remotely accessible server, a user's phone or smartphone, or combinations thereof. Such driver-specific information may be associated with a user's profile, which may then be accessed and applied to any vehicle driven by the user.

In some embodiments, the information relevant to a user may be stored as a part of an application. Such application may run on the user's smartphone or other electronic device, or on the vehicle directly. Within the application, information relevant to the user may be stored within a profile that is specific to that user (or to that vehicle, for example). In one example, the application may include additional functionality that allows a user track the instantaneous location of the vehicle and/or the driving habits of a user. For instance, the application may allow a parent to track the whereabouts of their teenager by tracking the location of the car. The parent may also be able to track the driving habits of the teenager using information collected while the teen drives.

In some examples, a user owns more than one vehicle. For example, a wife may own two vehicles but share these vehicles with her husband. In some examples, input information from both users (e.g., wife and husband) is used to make a prediction about one or both of the users' driving and pre-heating requirements. In some examples, the driving data from multiple vehicles is pooled to make a prediction about a single user in a single vehicle. For example, input information from the wife's use of both vehicles can be used to make a prediction about one of the vehicles that the wife happens to be driving on a given day.

In some methods set forth herein, the methods include an input step where information is provided for making a prediction about when and how much to pre-heat a battery. The methods may further include analyzing the information provided and generating a prediction regarding when and how much to pre-heat a battery. The methods may further include generating a comparison between the prediction and the actual performance of the battery (e.g., time of a drive, battery power used for the drive, pre-heating applied, lead time used, heating performance, driving performance, discharge or charge performance, etc.). Based on this comparison, a refinement on the first prediction is made so as to improve subsequent predictions with respect to accuracy. By including these steps, for example, the computer or management system which controls the battery can learn about a user and make more accurate pre-heating predictions as time progresses. This learning can include machine learning, data-mining, statistical pattern recognition, supervised learning (e.g., parametric/non-parametric algorithms, support vector machines, kernels, neural networks) and unsupervised learning (e.g., clustering, dimensionality reduction, recommender systems, deep learning).

Example 1

In this example, the control system analyzes the plurality of parameters and temperature readings set forth herein, including when the driver is likely to drive. These parameters in one example include the proximity of the driver's cell phone with respect to the vehicle or whether or not the cell phone is turned on. During the time that the cell phone, with the user, approaches the vehicle, the battery is pre-warmed so that it is at a predetermined level when the driver arrives at the vehicle.

Figure 3A:
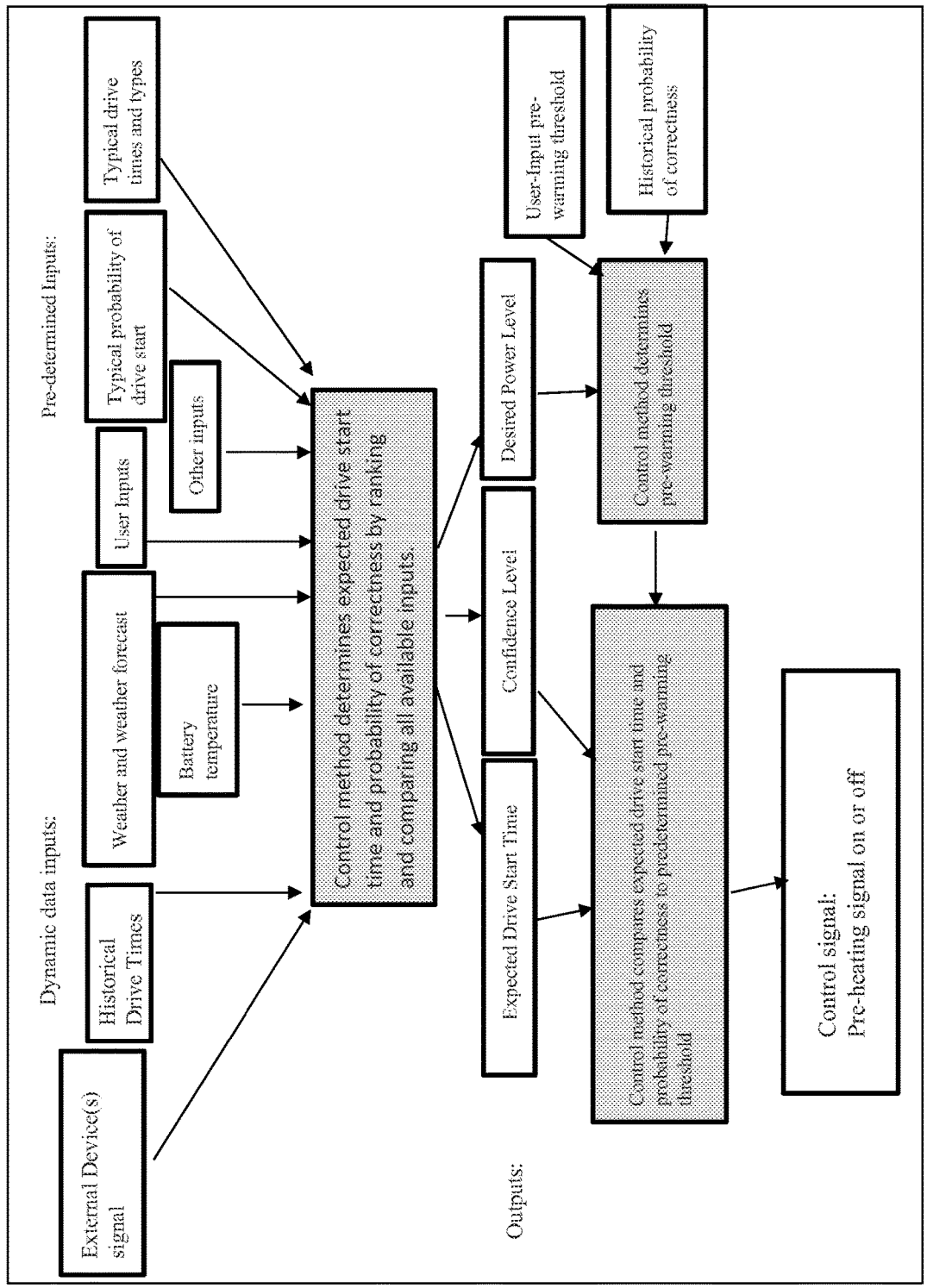
FIG. 3A depicts various inputs and outputs that may be used in determining whether, when, and how much to pre-heat a battery in certain embodiments.

FIG. 3A presents an example method for determining whether and when to pre-heat a battery of a vehicle. In this example, the input parameters include signals from one or more external devices, historical driving record (e.g., historical drive start times and historical drive durations, etc.), current weather and forecast information, the current temperature of the battery, user inputs such as preferences, typical probability of drive starts, typical drive times and types, and other inputs. The method uses these inputs to determine an expected start time and a confidence level that a drive will occur at the expected start time. The method may rank, compare and otherwise analyze the various input parameters to determine an expected drive start time and probability of correctness (e.g., the probability that a drive will start for each time over a given time window), as well as the desired power level. The desired power level is discussed further below. Generally speaking, the desired power level is determined by the type of drive that is predicted and the power level optimal for such a predicted drive type. The various inputs may also be used to determine the probability threshold (sometimes also referred to as the pre-warming threshold). As noted above, if the confidence level that a drive will start at an expected start time exceeds the probability threshold, pre-warming will occur to warm the battery to a desired temperature with a sufficient lead time such that pre-warming is complete by the desired time (i.e., the time at which the confidence level of starting a drive exceeds the probability threshold). In the event insufficient time exists to warm the battery system to the pre-determined level, the system will seek to minimize the difference between the actual battery temperature achieved and the temperature that was pre-determined to be optimal. In some cases, the probability threshold may be set for a given system (i.e., a static threshold is used, rather than a dynamically calculated threshold). Other inputs that may be useful for determining the probability threshold include user inputs (e.g., user input probability threshold, user input preferences, etc.), and historical probability of correctness. The historical probability of correctness refers to the previous correctness of the method in predicting drive start times. The historical probability of correctness may be useful in refining a method used to determine the probability that a drive will start at a given time (i.e., the confidence level). Such feedback-based improvements are discussed further below.

Next, the method compares the probability threshold to the confidence level that the vehicle will start at an expected start time. The output of this comparison determines whether a control signal is sent to pre-heat the battery. For instance, if the probability threshold is determined to be 70% and the confidence that a drive will start at 8 a.m. is 75%, pre-warming will occur to warm the battery to a desired temperature by 8 a.m. If it is determined that pre-warming will take 15 minutes (e.g., due to a probability-based expectation that the upcoming drive will involve city driving and no highway driving (which determines an optimal battery temperature), and a sensor determination of the current battery temperature), a control signal may be sent to begin pre-heating around 7:45 a.m.

Figure 3B:
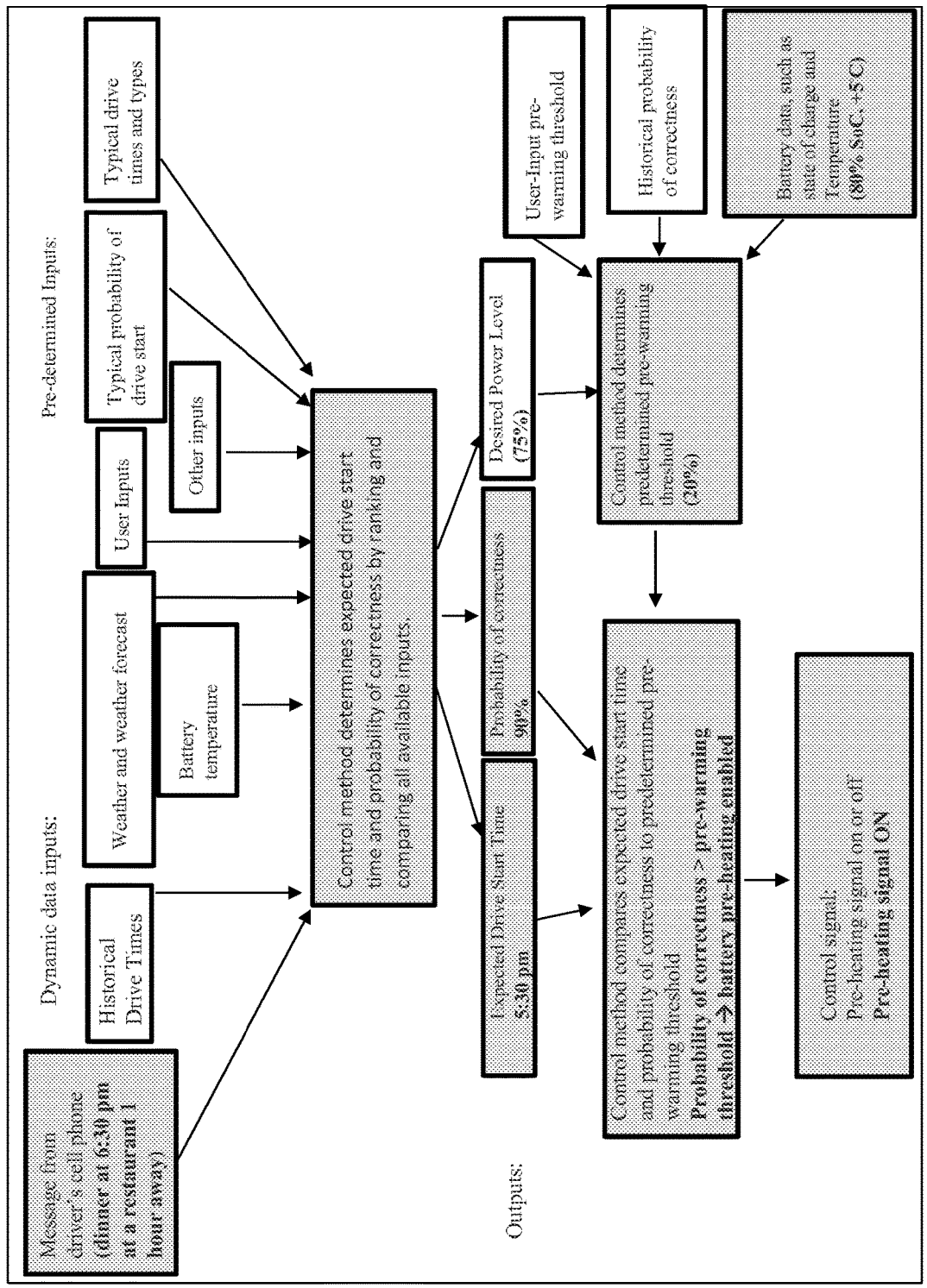
FIG. 3B depicts an example showing particular inputs and outputs related to FIG. 3A.

FIG. 3B presents a specific example of the method shown in FIG. 3A. Here, one of the inputs includes a text message from a user's cell phone. The text message indicates that the user will meet a friend for dinner at 6:30 p.m. at a restaurant that is 1 hour away from the vehicle's current location. Another input includes the vehicle's current location. Based on these and the other input parameters, it is determined that at about 5:30 p.m. there is a 90% confidence that a drive will start. In some cases the drive start times may be binned together for purposes of determining the probability that a drive will start (e.g., binning by every minute, every five minutes, every ten minutes, every fifteen minutes, every thirty minutes, etc.). The probability threshold is determined to be 20%, based on various inputs including, for example, battery data such as the a state of charge (in this example 80%) and current battery temperature (in this example 5° C.). Because the confidence level of starting a drive at the expected start time exceeds the probability threshold, battery pre-warming will occur. The various inputs are also used to determine a desired power level, which in this case is determined to be about 75%. Assuming that the battery has a cell power capability as in FIG. 1A, this means that the battery should be raised to a temperature of about 15° C. The current temperature of the battery (5° C.), the desired temperature of the battery (15° C.) and the battery properties (e.g., heat capacity), may be used to determine a heating duration. As shown in Table 4, below, a typical lithium ion battery will take slightly less than ten minutes to pre-heat by 10° C. As such, the lead time for pre-heating will be about ten minutes, and pre-heating will begin at around 5:20 p.m.

Example 2

Figure 4:
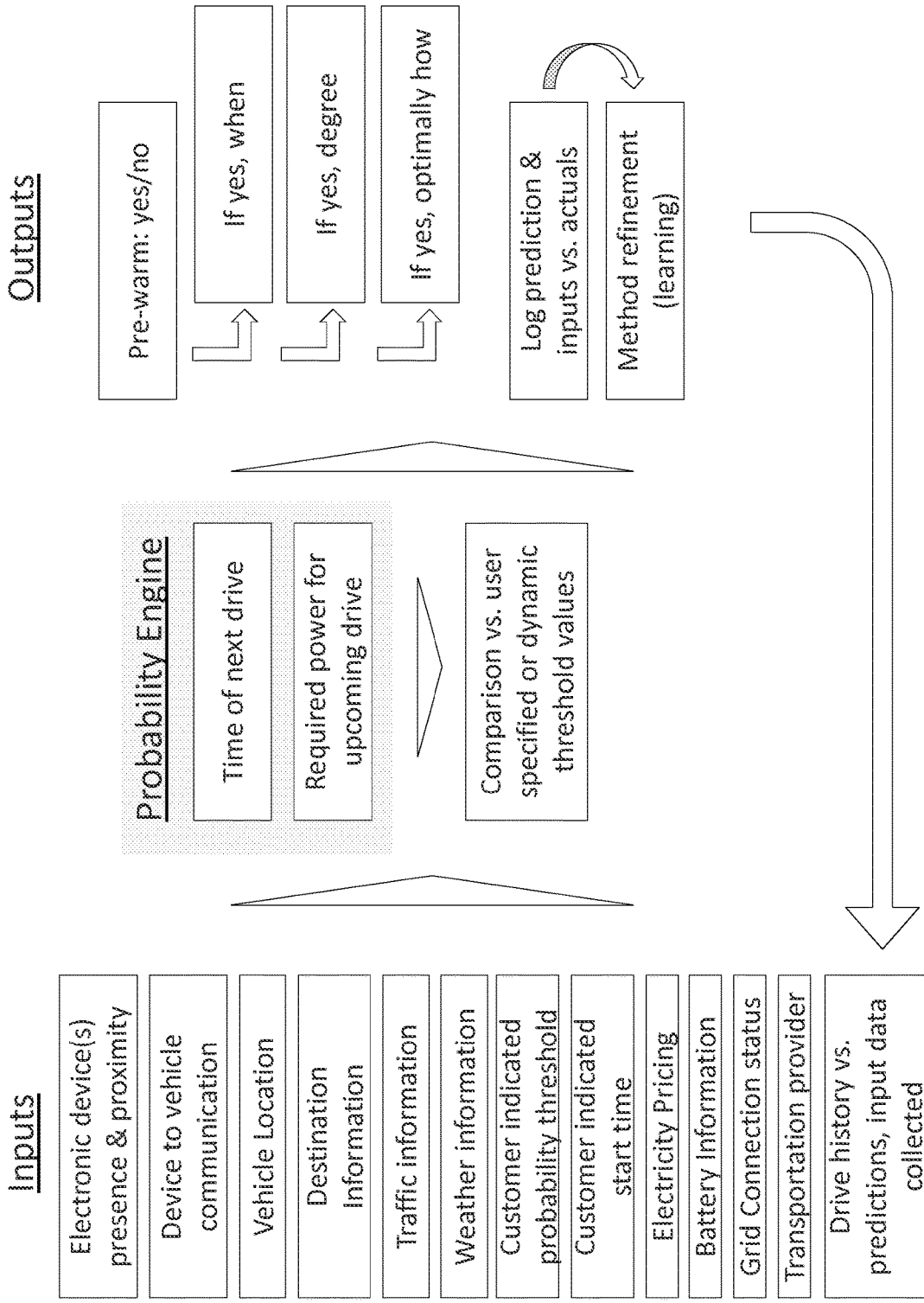
FIG. 4 depicts a further example describing various inputs and outputs that may be used in determining if, when, and how much to pre-heat a battery according to an embodiment.

FIG. 4 presents another example illustrating the various inputs and outputs in one example embodiment. Here, the inputs include signals from electronic device(s), for instance signals related to a user's presence and/or proximity to a vehicle, any communication made from an electronic device to the vehicle, the vehicle's location, information regarding a user's destination, information regarding traffic, information regarding weather, a customer indicated probability threshold or preferences on such threshold, a customer indicated start time, electricity pricing, battery information, grid connection status, and drive history vs. past predictions. Any combination of these inputs may be used. A probability engine is used to determine, from the various inputs that are present, a predicted time for the next drive (along with an associated confidence level), and the power that such a predicted drive is expected to utilize. The confidence level is compared with the probability threshold (which may be pre-set or dynamically calculated). If the confidence level that a drive will occur at a particular time exceeds the probability threshold, a decision to pre-warm is made. If this decision is made, the inputs may also be used to determine at what time pre-heating should begin, to what temperature the batteries should be heated, and in some cases an optimal heating method. The predictions (e.g., whether to heat, the pre-heating end temperature, the pre-heating duration/lead time) can be recorded/logged, along with the various inputs that were used to determine these predictions. The predictions can be compared against the actual driving record (whether driving occurred as predicted, the amount of power that was actually needed/used, actual pre-heating duration, etc.), and the method of determining the predictions can be refined. This feedback-based refinement is discussed further below. In various embodiments, machine learning techniques may be used to implement the feedback-based refinement.

Certain combinations of the inputs shown in FIG. 4 are expected to be particularly useful. Though certain combinations of inputs are highlighted, it should be understood that any combination of available inputs may be used without departing from the scope of the disclosed embodiments. In various embodiments, the inputs include (optionally among other inputs) any combination of (a) signals from an electronic device (e.g., signals relating to a user's presence/location or proximity to a vehicle), (b) device to vehicle communication (e.g., information originating in a user's text messages, emails, calendar, Google Now information, etc.), (c) information regarding a user's destination, (d) information regarding traffic, (e) information regarding weather, (f) and a user indicated probability threshold or preferences on such threshold/battery management system.

In a similar embodiment, the inputs may include (optionally among other inputs) any combination of (a) device to vehicle communication, (b) vehicle location, (c) information regarding a user's destination, (d) and information related to traffic.

Example 3

At 8 a.m. on Sunday, when the cell phones from user "A" and user "B" are both present at a specific coordinate (e.g., the users' kitchen table), the system may predict that the next upcoming drive will begin between about 8:30-8:50 a.m., with a predicted destination of St. Joseph's church, which is 3 miles away from the users' present location. Based on the available information (which may, for example, include several past Sunday morning drives to St. Joseph's), the system may have a confidence of 95% for this prediction (with respect to the time of departure, destination, or both). In response to this prediction, the battery system may cause the battery to begin pre-heating at 8 a.m. if 20 minutes are required to heat battery to performance level required for this drive. Similarly, if the conditions suggest that only about 10 minutes will be needed to pre-heat the battery to the appropriate temperature/power level, the battery system may cause pre-heating to begin around 8:10 a.m. During and/or after the actual drive, the battery system may evaluate the actual drive time and/or power used, and compare it to the predicted drive time and the predicted power level. The data and/or relationships used to predict the drive time/power/etc. may then be updated based on this comparison, thereby making subsequent predictions more accurate.

Example 4

This example relates to off-site parking at the airport. When combined with flight information from a user's electronic device (e.g., an email or other form of itinerary indicating that the user will be arriving at the airport by plane) and proximity of the user's cell phone within 1 mile of the vehicle, there may be a 99% confident forecast the next drive will start within about 10-30 minutes after the plane lands. The probability threshold used to determine whether pre-heating occurs may be relatively higher in this case given the likely longer time between drives when the user was away on their trip.

In a related example, the battery system may operate such that no pre-heating occurs for a specified time period, for example while the user is away on a trip. The battery system may obtain/infer trip information from any available source. In one case, the battery system obtains trip information from a flight itinerary stored in a user's email, the itinerary indicating that a user will be in Hawaii between June 10-17. Based on this information, the battery system may determine that no pre-heating should occur between the time that a user parks the vehicle at the airport and the time that the June 17 flight lands.

Example 5

In some examples, pre-heating is not employed. These examples are provided, in part, to illustrate the benefit of certain pre-heating methods set forth herein. A battery-powered electric vehicle is left at the airport in the winter, wherein for several days the vehicle is not operating and is subjected to freezing temperatures. A user intends to return to the airport after several days to use the vehicle.

In one example, the battery is not pre-heated at all. When the user starts the vehicle, the battery performs sub-optimally because the battery is cold.

In some examples, pre-heating is undertaken using methods that are less reliable than various disclosed embodiments. These examples show, in part, the benefit of certain pre-heating methods set forth herein. In one case, the battery is pre-heated each time the battery falls below a predetermined temperature setting, e.g., 0° C. In this example, after several days of such pre-heating, the battery has exhausted a majority of its energy. When the vehicle user starts the vehicle, the battery has a low battery charge, which results in a reduced range of use. In addition, the battery is not heated at the time that the vehicle user actually uses the vehicle since the battery is only heated based on the external temperature and not based on when the user uses the vehicle.

In another pre-heating example using less reliable prediction methods, the battery is heated each day at 8 a.m. because that is when the battery was historically used, and the battery is heated solely based on this input parameter.

In the three examples immediately above, the battery fails to perform at a pre-determined or optimal level because the pre-heating method was inadequate for a vehicle left at an airport. Conversely, where various pre-heating methods disclosed herein are used, a vehicle left at an airport (or other location) will pre-heat using a smarter method, and the battery is more likely to perform as desired when needed.

Example 6

In another example, the battery is pre-heating according to the methods set forth herein. In this particular example, the vehicle receives information through its wireless communication devices that the user's electronic device (such as cell phone) has been turned on, has entered the region of the nearby cellular base station, or is otherwise in the vicinity. Using this and optionally other information, the vehicle obtains several minutes of notice time to pre-heat the battery. The result is a significantly warmed battery when the user arrives at the vehicle and starts the operation of the electric vehicle. In addition, the battery is not heated for the days that the vehicle sits at the airport before the user arrives to use the battery. As such, battery energy is not wasted to unnecessarily warm the battery before it is actually needed to be used.

In another example, the vehicle is programmed to check the flight arrival schedule associated with the vehicle user. Based on this arrival schedule, and information that the user's arriving plane landed, the vehicle is programmed to pre-heat the battery so that the battery is pre-heated when the user arrives at the vehicle.

Example 7

This example relates to pre-heating in winter. In an example, a vehicle is subjected to winter conditions where the ambient temperatures are below −20° C. In this example, the temperature of battery cells falls to near −20° C. overnight. At −20° C., battery cells can only deliver a small fraction of the power available at +20° C., which is insufficient to accelerate the vehicle (at average or safe rates). As can be seen in FIG. 1A, typical battery cells can only deliver about 10% of their maximum power at −20° C.

An electric vehicle without effective battery pre-heating would be severely power limited, and the battery power capability at −20° C. may be so low that vehicle is deemed not sufficient (e.g., unsafe) to drive.

Using the predictive pre-heating methods set forth herein, the vehicle receives information before the driver enters the vehicle. In one example, this information arrives at least 1 min, and in some other examples, more than 5 minutes, before the drive start time, This information allows the vehicle several minutes to warm up the battery cells significantly, or by at least 5° C. As an example, a 40 kilowatt-hour battery may have a relevant heat capacity of around 266 KJ/° C., or perhaps 133 KJ/° C. if it's a very high energy-density battery possible in the future. In this case, a 5-minute warm-up time with a 5 kilowatt heater would allow battery temperature increase of about 5.5° C. and about 11° C., respectively—both significant. However, a 1-minute warm-up time would only allow a battery temperature increase of no more than approximately 1° C. and 2° C. for the regular and high-energy-density batteries, respectively, which is not significant for the instant Example. Thus, the multi-minute warm-up time is sufficient to enable meaningful battery heating and thus increased battery performance.

Example 8

This example provides insight into how the different input parameters can affect the probability determinations. Various sub-examples are provided.

In each of the sub-examples in this section, a 90% probability threshold within a 30 minute time window is used.

Example A: Using only the historical drive start information, there is only a 40% probability that a drive will start at a relevant time. Because the confidence level is less than the probability threshold, no signal to pre-heat is given and pre-heating does not occur. FIG. 5A provides the confidence that a drive will start over the times shown based on the historical drive start information.

Example B: Using a combination of historical start time information with vehicle/driver location (home) improves confidence level, however, the confidence level is still below the probability threshold value, so pre-heating does not occur. FIG. 5B provides the confidence that a drive will start over the times shown based on the historical drive start information and based on the user's location. Combining these inputs leads to a 60% confidence that driving will occur at a relevant time. This confidence is higher than in example A, but still not sufficiently high to reach the probability threshold, so no pre-warming occurs.

Figure 5C:
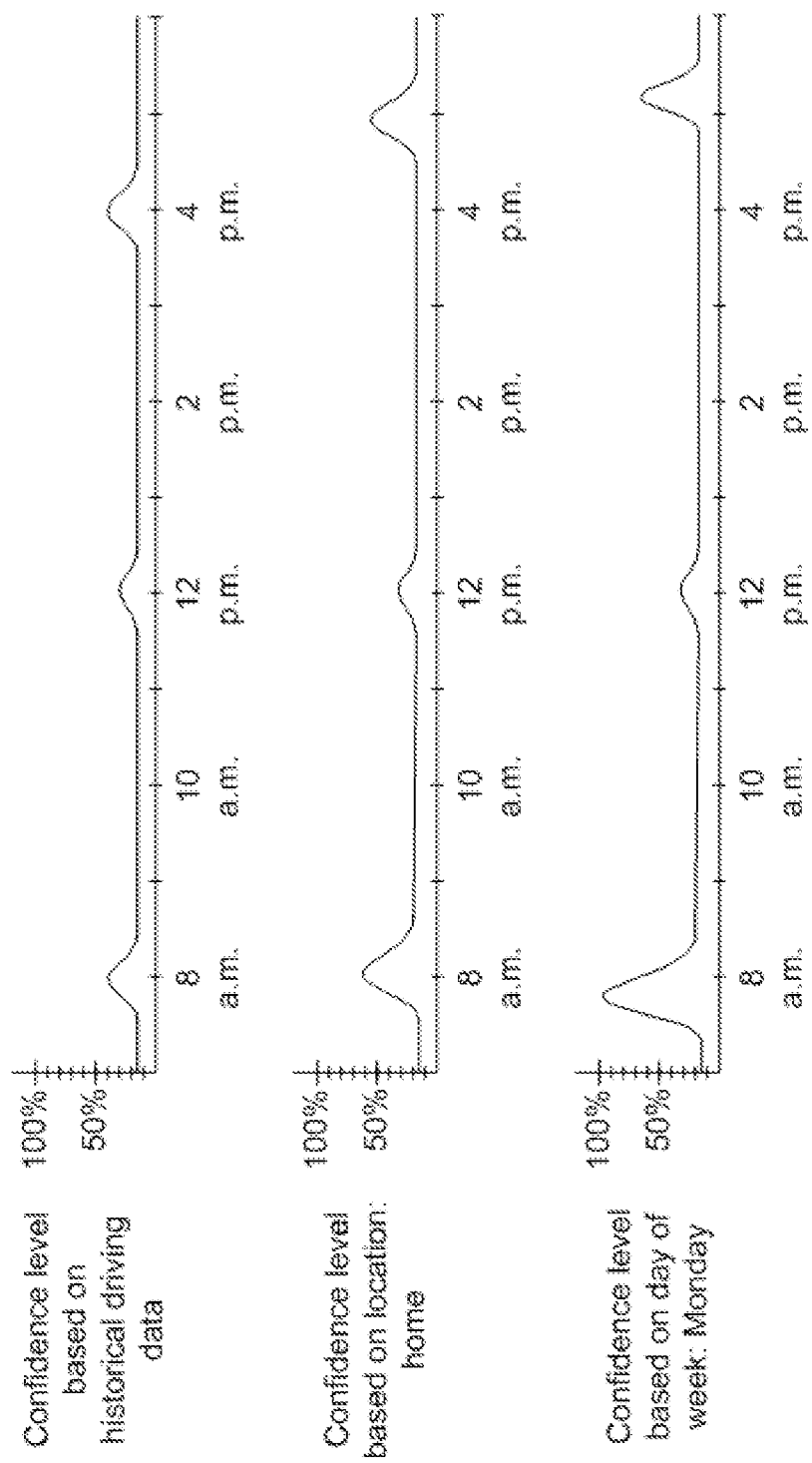

Example C: Using a combination of historical information, location (home), and day of the week (Monday) increases forecast confidence above the probability threshold value, so a decision to pre-warm is taken. In this example, the vehicle will send a control signal to a battery system so that pre-heating occurs to pre-warm a battery to a desired temperature at the desired time. FIG. 5C shows the confidence that a drive will start over the time period shown based on the historical drive information, based on the location of the vehicle being at home, and based on the current day of the week. By combining these inputs, the confidence reaches 90%, enough to reach the probability threshold.

Figure 5D:
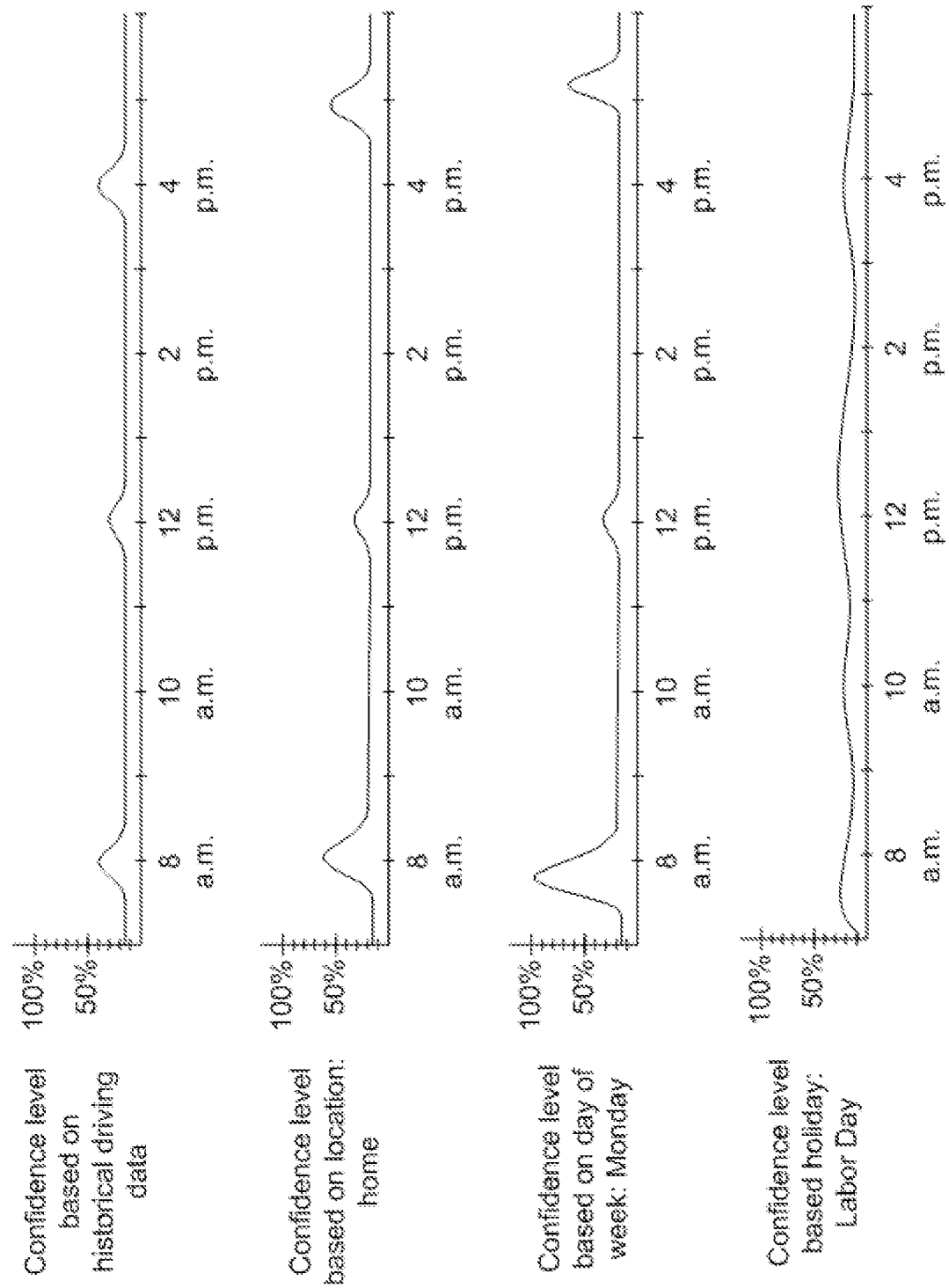

Example D: In this example, information that it is a holiday (e.g., Labor Day) is used in addition to the inputs described in Example C. The new information leads to a readjustment of the confidence level, leading to a conclusion that there is insufficient confidence to initiate pre-warming. Here, the fact that it is a holiday reduces the confidence that driving will occur as would otherwise be normal for a Monday. This information brings the confidence of starting a drive below the probability threshold, so no pre-warming occurs. FIG. 5D shows the confidence that a drive will start over the time period shown based on the historical drive start information, based on the location of the vehicle at home, based on the current day of the week, and based on the holiday status. By combining these inputs, a 90% confidence is not reached that driving will occur at a relevant time, and consequently no pre-warming will occur.

Figure 5E:
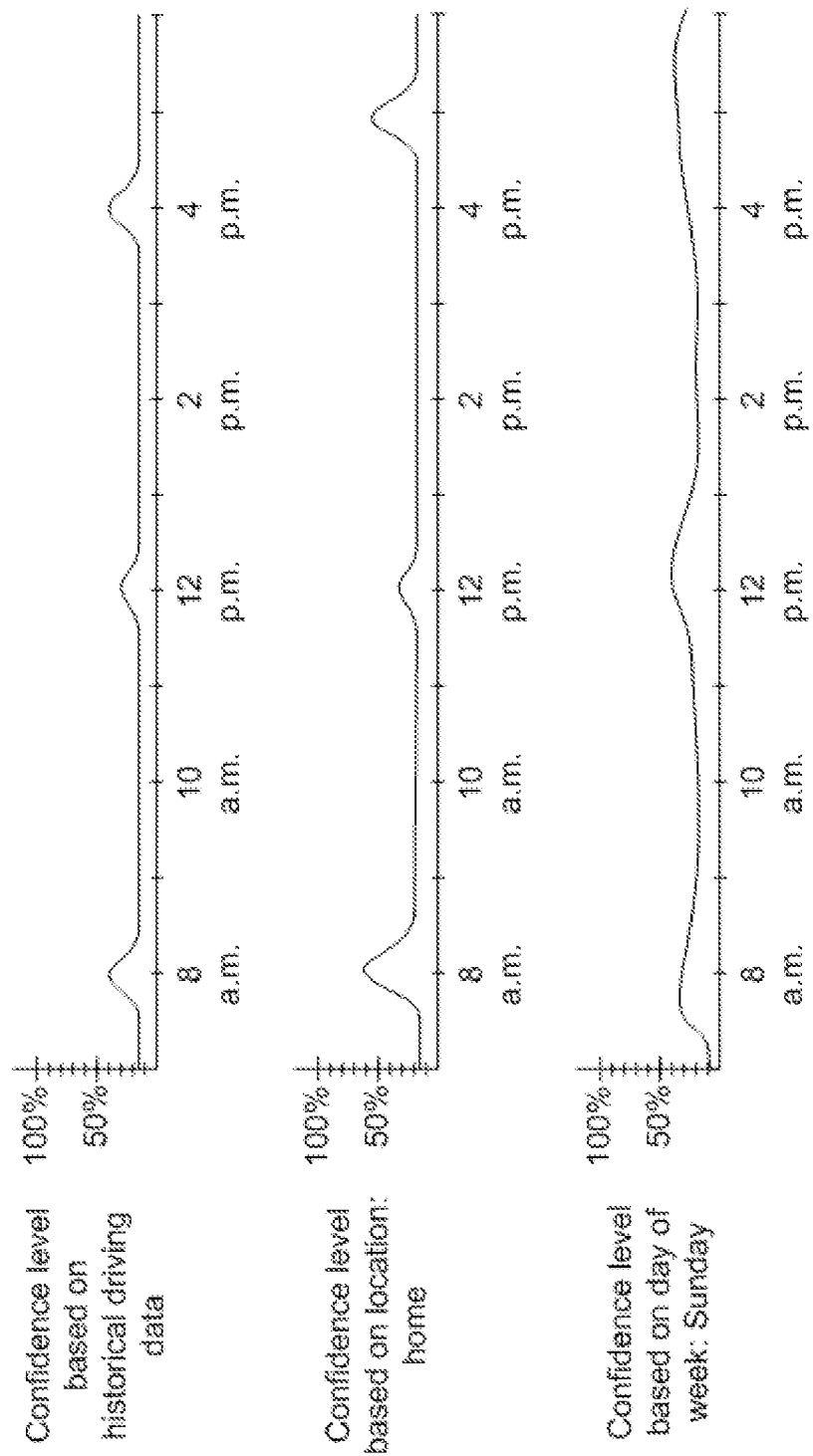

Example E: In this example, the basic input parameters include historical drive start information, combined with location (home), and day of the week (Sunday). These inputs result in a determination that the confidence level of driving at the relevant time is less than the probability threshold, so pre-warming does not occur. FIG. 5E shows the confidence that a drive will start over the time period shown based on the historical drive start information and based on the day of the week being Sunday. Combining these inputs, there is only a 15% confidence that pre-warming will occur, which is not sufficient to reach the probability threshold, and pre-warming does not occur.

Figure 5F:
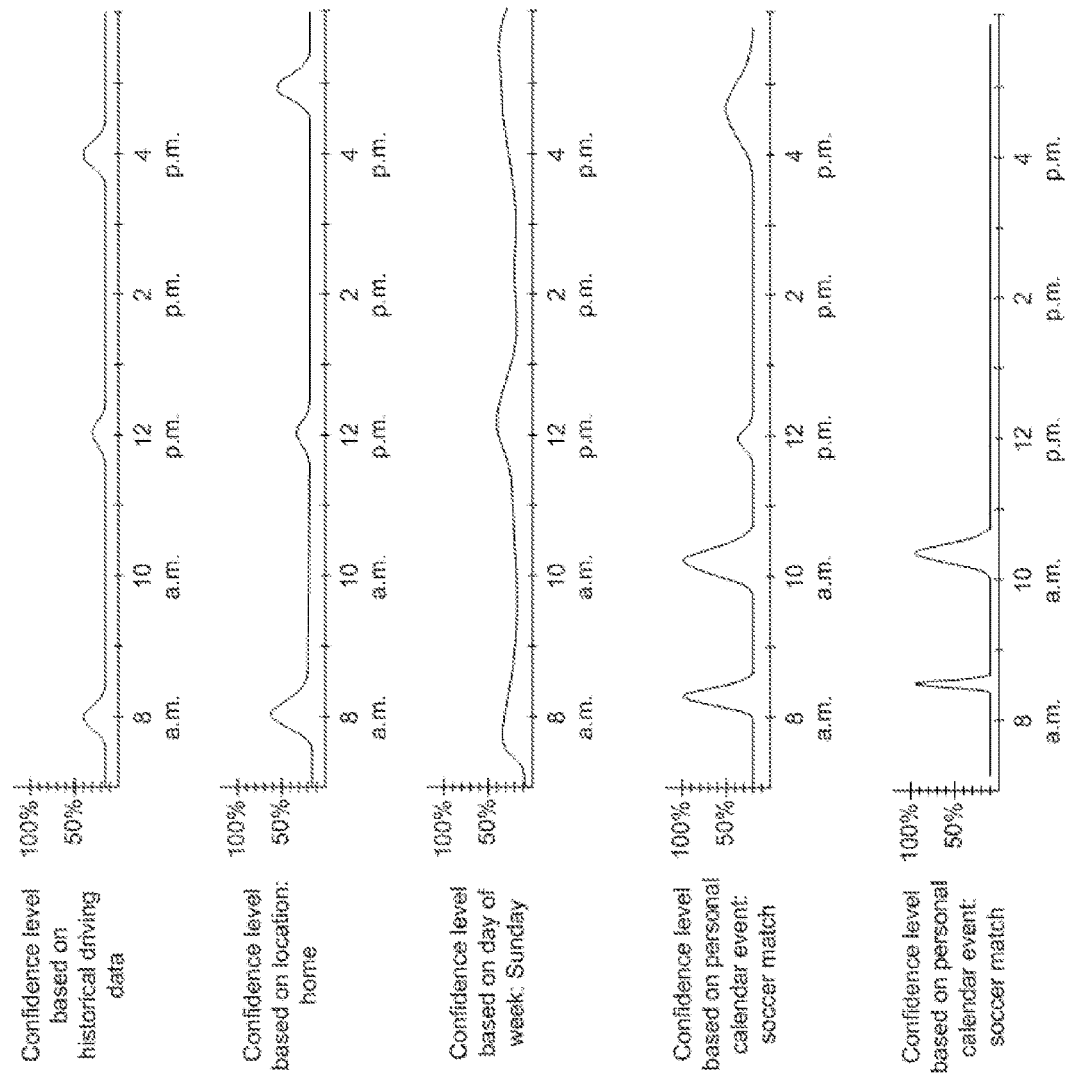

Example F: In this example, the input parameters include those in Example E, as well as personal calendar information (soccer match @9 a.m.). The calendar information increases forecast confidence to 90%, which reaches the probability threshold. Therefore, a decision to pre-warm is made. The addition of phone proximity information based on users A and B sitting at the kitchen table further improves confidence to 95%. This does not change the decision to pre-warm, but with higher confidence, slightly delays the start time. FIG. 5F shows the confidence that a drive will start over the time period shown based on the historical drive start information, based on the day of the week being Sunday, based on personal calendar information including the scheduled soccer match, and based on the phone proximity for two users. Combining these inputs leads to a decision to pre-warm.

The various confidence levels based on the inputs can be combined to generate more accurate predictions. The various inputs may be combined in a way similar to how waves are combined in the context of constructive interference. For instance, individual waves of low probability can sum to higher levels of probability when considered in combination.

Example 9

In this example, consider a case where the battery control module receives a signal from a cellular base station through a wireless communication interface that the driver's smart phone has entered the area of the same base station tower. Using both pre-programmed and vehicle historical information, the battery control module knows this data has a high probability of predicting an upcoming vehicle start (>80%). At the same time, the probability threshold is quite low (in this case 30%), for example because the state of charge of the battery is high. Since the probability of correctness is higher than the probability threshold, the battery control system would enable battery pre-heating.

In another example, the battery control module receives a signal from the driver's smart phone through the wireless communication interface that the driver has an appointment at 9 a.m. in a location approximately 1 hour away. Using both pre-programmed and vehicle historical information, the battery control module knows this data has a high probability of predicting an upcoming vehicle start (e.g., a confidence >90%). The probability threshold value is calculated to be medium (in this case 50%). Since the confidence level is higher than the probability threshold, the control system would enable battery pre-heating.

In another example, consider a case where the vehicle has historical data indicating that the vehicle is often driven around 8 a.m. on Mondays, and no other data sources are provided. From historical usage, the battery control system has a confidence of 60% that driving will occur based on this data source. However, the pre-warming threshold value is high (in this case 90%) because the state of charge of the battery is low. Since the confidence level is lower than the probability threshold, the control system would not enable battery pre-heating.

In another example, consider a case where the vehicle has historical data indicating that the vehicle is often driven around 8 a.m. on Mondays, and no other data sources are provided. From historical usage, the battery control system determines a confidence of 60% that driving will take place based on this data source. In this example, the pre-warming threshold value is calculated to be low (in this instance 15%) because the state of charge of the battery is high and the typical drive is short to a destination with a charger. Since the confidence that driving will occur is higher than the probability threshold, the control system would enable battery pre-heating.

Example 10

This example illustrates one method for determining an expected start time and confidence level. Various inputs are provided with pre-determined weighing factors. The weighing factors describe the relative importance of the various inputs in determining whether and when driving is likely to occur. The inputs and weighing factors are presented in Table 2.

TABLE 2

| | INPUT: | | | | | | | |
|---|---|---|---|---|---|---|---|---|
| | Information from electronic devices: driver's cell phone message | Information from electronic devices: driver's calendar information | Historical drive times | Weather forecast | Battery Status (SOC, Temperature, etc.) | Driver input | Upcoming drive type | Destination type (i.e., next charging opportunity) |
| WEIGHING FACTOR: (scale 1-10) | 7 | 10 | 3 | 2 | 3 | 10 | 2 | 1 |
| INPUT PRESENT? Yes = 1 No = 0 | 0 | 1 | 0 | 0 | 1 | 0 | 1 | 0 |

The available inputs and their weighing factors may then be combined in various fashions to determine an expected drive start time and a confidence level and (optionally) a desired power capability. As an example, the inputs may be combined according to the sum of products of inputs and their respective weighing factors. As an example from Table 2 above, the inputs that are present are:

1) Info from electronic devices: driver's calendar information
2) Battery Status (SOC, Temperature, etc.)
3) Upcoming drive type The sum of the products would be: 10*1+3*1+2*1=15

Since the maximum points in this example is 38 (7*1+10*1+3*1+2*1+3*1+10*1+2*1+1*1=38), this also equals 40%.

In addition to independently-evaluated inputs, there may be combinations of inputs that are known to predict upcoming drives accurately, so they are given an independent weighing factor when present together. For example, a combination of a meeting notice in the user's calendar and the fact that it is morning may indicate a drive to a meeting at work at a higher level of confidence than the inputs present independently. This example is presented in Table 3. Combined inputs are especially effective in predicting the confidence that a drive will occur. Further, such combined inputs are particularly beneficial when implemented in a method that involves feedback/learning over time.

TABLE 3

| | INPUT: | | | | | | | | |
|---|---|---|---|---|---|---|---|---|---|
| | Information from electronic devices: driver's cell phone message | Information from electronic devices: driver's calendar information | Historical drive times | Weather forecast | Battery Status (SOC, Temperature, etc.) | Driver input | Upcoming drive type | Time of Day (6-10 am) | Information from electronic devices: driver's calendar information AND Time of Day |
| WEIGHING FACTOR: (scale 1-10) | 7 | 10 | 3 | 2 | 3 | 10 | 2 | 1 | 10 |
| INPUT PRESENT? Yes = 1 No = 0 | 0 | 1 | 0 | 0 | 0 | 0 | 0 | 1 | 1 |

Here, the sum of the products would be 11 (10*1+1*1+10*1=21). Since the maximum points in this example is 48, the predicted drive probability equals 21/48 or 44%.

As noted above, the second value that is determined is the pre-warming threshold, also referred to as the probability threshold. The pre-warming threshold value may be dynamically calculated, as well, to take into account all relevant factors in a similar fashion as the confidence level. The pre-warming threshold is expected to often be high (e.g., >75%) due to the high cost of heating the battery unnecessarily (loss of battery energy). The pre-warming threshold is likely to be somewhat lower if the battery is at high SOC, and very high (near the top of the scale) if the battery is at low SOC. In one example, a user chooses/inputs a pre-warming threshold of 30% (which is relatively low), since the user prefers high power availability over maximum range. Other example factors that can affect an optimal pre-warming threshold are discussed above.

The resulting confidence level is then compared to the pre-warming threshold value. If confidence level exceeds the pre-warming threshold, battery pre-heating is enabled. In the above examples presented in Tables 2 and 3, the confidence level (40% and 44% in the two examples, respectively) is higher than pre-warming threshold (30%), so battery heating is enabled.

Mathematical tools such as regression and multivariate analysis may be used to establish most fitting relationships between inputs, and assign weighing factors for each input. Other mathematical and computational analysis tools may be used, as well. In various embodiments, machine learning techniques such as those mentioned herein may be used to identify important variables and relationships that affect if/when/and what type of drive is predicted. These techniques may use feedback/learning to continuously improve the predictive power of the methods described herein.

Predicting the Required Power and Heating

The methods disclosed herein allow for a battery to be heated dynamically. Dynamic battery heating involves heating a battery to a level required for a predicted type of vehicle performance. Because the disclosed embodiments may be used to predict the type of vehicle performance needed (e.g., lower performance if city driving is expected, higher performance if highway driving is expected), dynamic heating can be used to heat the battery as needed for a particular predicted drive.

Various inputs described above may be used to predict the type of drive and level of power needed for an upcoming drive. Each input may be personal to a vehicle/user or they may be general. Each input may be historical or current. Each current input can be sensed or referenced. Example inputs that may be particularly important for predicting the level of performance needed include, but are not limited to, the location of the vehicle and/or user, the existence/location of scheduled events relevant to a user (which may appear in scheduling applications, Google Calendar, text messages, emails, etc.), the distance between a vehicle/user and a scheduled event, the distance between a vehicle and a user, historical driving history (e.g., route, distance, city vs. highway driving, user driving habits such as accelerating quickly or slowly, etc.) for various days of the week/holidays/other recurring events, battery warming characteristics, current and/or historical weather data, current and/or historical traffic and/or construction data, etc. Generally speaking, any input which is used to determine whether and when a drive will occur can also be used to determine the type of driving that is expected and the resulting level of power that the vehicle will utilize.

In some embodiments, the inputs may be used to determine a probability-weighted route map, with associated power requirements. The probability-weighted route map may include various predicted routes and the probability that each route will be taken. In a particular example a probability-weighted route map and the associated power requirements are determined based on any combination of the following factors: current location of vehicle and/or user, map information, calculation of route options, determination of optimal route choices, traffic conditions, and historical choices. Other input parameters may be used as well. The probability weighted route map is discussed further below with reference to FIG. 7.

The type of drive expected (e.g., city driving, highway driving, aggressive driving, non-aggressive driving, high-traffic or stop-and-go traffic vs. light traffic, etc.) and the vehicle characteristics (e.g., weight of vehicle, motor power of vehicle, etc.) determine the power level that should be available to accommodate such driving. This power level determines the temperature to which the battery should be pre-heated. In certain embodiments, minimum power levels may be set for particular types of drives. These power levels depend on the design of a particular vehicle and battery system. In one example, a 3000 pound vehicle is assumed with a 150 kW motor. 30 kW may be designated as the minimum safe level for any driving, 40 kW may be designated for urban driving, 60 kW may be designated for highway driving, 120 kW may be designated for enthusiast drivers/aggressive driving, and 150 kW may be designated for full performance. These are provided as examples and are not intended to be limiting. Other types of driving may be used (i.e., the types of driving may be categorized differently), and different power levels may be designated. The various power levels may be designated by a vehicle manufacturer or battery manufacturer in some cases. In other cases the power levels may be set without input from a manufacturer, for example based on characteristics of a vehicle and/or battery. In certain cases, desired power levels can be mapped to the battery system temperatures, state of charge, and life.

The battery temperature required for optimal performance is calculated from the battery system temperature vs. performance plot (e.g., FIG. 1A or a similar plot), as adjusted for the age and SOC of the battery. A difference in temperature from the current battery temperature (before pre-heating) to the desired temperature is calculated, at times also factoring in the natural warm-up from driving if the predicted peak power level is not needed immediately (discussed further below). The temperature difference between the current battery temperature and the desired temperature then controls how much heat should be applied to raise the battery to the desired temperature. The heating characteristics of the heater (e.g., power delivered by the heater) and the heating characteristics of the battery (e.g., heat capacity), together with the relevant temperature difference, determine the duration over which heating will take place. This duration is the relevant lead time for pre-heating.

Table 4 below shows the cell temperature increase after various heating intervals for typical regular Li-ion and high-energy-density cells. The cell temperature increase assumes that 5 kilowatts of heating power reaches the cells from a heater, and that the effective heat capacity of cells (and potentially adjacent components that become heated) is 266 KJ/° C. and 133 KJ/° C. for regular Li-ion and high-energy-density cells, respectively.

TABLE 4

| | Heating Time | | | | | | | | |
|---|---|---|---|---|---|---|---|---|---|
| | 1 second | 10 seconds | 30 seconds | 1 minute | 2 minutes | 5 minutes | 10 minutes | 30 minutes | 1 hour |
| Typical Li-Ion cells: | | | | | | | | | |
| Heater Energy Output (kJ) | 5 | 50 | 150 | 300 | 600 | 1500 | 3000 | 9000 | 18000 |
| Cell Temperature Increase (degrees Celsius) | 0.02 | 0.19 | 0.56 | 1.13 | 2.26 | 5.64 | 11.28 | 33.83 | 67.67 |
| High Energy Density Cells: | | | | | | | | | |
| Heater Energy Output (kJ) | 5 | 50 | 150 | 300 | 900 | 1500 | 3000 | 9000 | 18000 |
| High-energy-density Cell Temperature Increase (degrees Celsius) | 0.04 | 0.38 | 1.13 | 2.26 | 4.51 | 11.28 | 22.56 | 67.67 | 135.34 |

From Table 4, one can see that for a range of cell energy densities, heater power levels and thermal system designs that are feasible, a warm-up time of 2 to 5 minutes (or even a bit more) is required to warm-up the battery cells by at least 5° C. Thus, even with oversized heaters or high-energy-density cells, sub-1-minute heating times are often insufficient.

As an example, consider a 24 kWh EV battery system having a power vs. temperature curve as shown in FIG. 1A (e.g., a typical regular Li-ion battery) and a peak rate of power of 5 P/E (i.e., 5 times the energy of the system) or 120 kW, where the battery system starts at −10° C. Without pre-heating, the battery system would be only capable of around 21.6 kW of power, generally below the minimum "safe" driving threshold mentioned above. Pre-heating lead times of a minute or less do not increase power capability significantly. However a pre-heating lead time of several minutes or more can significantly increase the amount of available power. Table 5 below presents data related to a pre-heating method using this example.

TABLE 5

| | Heating Time | | | | | | | | |
|---|---|---|---|---|---|---|---|---|---|
| | 1 second | 10 seconds | 30 seconds | 1 minute | 2 minutes | 5 minutes | 10 minutes | 30 minutes | 1 hour |
| Battery System Temperature (deg C.) | −10.0 | −9.8 | −9.4 | −8.9 | −7.7 | −4.4 | 1.3 | 23.8 | 57.7 |

TABLE 5-continued

| | Heating Time | | | | | | | | |
|---|---|---|---|---|---|---|---|---|---|
| | 1 second | 10 seconds | 30 seconds | 1 minute | 2 minutes | 5 minutes | 10 minutes | 30 minutes | 1 hour |
| Approximate Battery System Rate Capability (% of peak) | 18% | 18% | 18% | 18% | 20% | 25% | 38% | 95% | 100% |
| Battery System Power Capability (kW) | 21.6 | 21.6 | 21.6 | 21.6 | 24 | 30 | 45.6 | 114 | 120 |

In certain examples, a predicted drive will include multiple types of driving. For instance, a weekday morning drive may be predicted to include three miles of city driving between about 20-30 miles per hour, followed by ten miles of highway driving at 50-80 miles per hour. A lower power level is needed for the city driving compared to the highway driving. Because the battery can heat while the vehicle is driving on the city streets, it may be unnecessary to pre-heat the battery to a temperature that results in sufficient power for highway driving before the start of the drive. Therefore, in certain embodiments the pre-heating methods take the heating-while-driving into account and only pre-heat the battery according to what is needed. For instance, if it is determined that the pre-heating required for city driving accompanied by the heating occurring during city driving is sufficient to heat the battery to a required power level by the time the user enters the highway, then the pre-heating can be limited to that needed for city driving. Similarly, if it is determined that the pre-heating required for city driving accompanied by the heating occurring during city driving does not sufficiently heat the battery to a level that provides sufficient power for highway driving, the pre-warming can be conducted to raise the battery temperature to one higher than that required merely for city driving. The warming that occurs while driving may occur naturally (e.g., due to transfer of waste heat from an engine, heat generated on discharge due to battery inefficiency, etc.) and/or it may be driven by the system/method used to pre-heat the battery. Where the pre-heating system is used, it may be desirable that some portion of the heating occurs while driving, for example where highway driving is expected to occur after urban driving. This delayed heating may be beneficial because if a prediction that driving will occur is incorrect, the battery only pre-heats to a level needed for urban driving, rather than heating all the way to a temperature that allows for highway driving. Thus, the wasted energy due to an incorrect driving prediction is minimized. Further, the pre-heating can occur with less lead time where staged heating occurs (e.g., pre-heating before driving and heating during driving) because the battery only needs to pre-heat to a lower temperature to immediately enable urban driving.

Figure 6A:
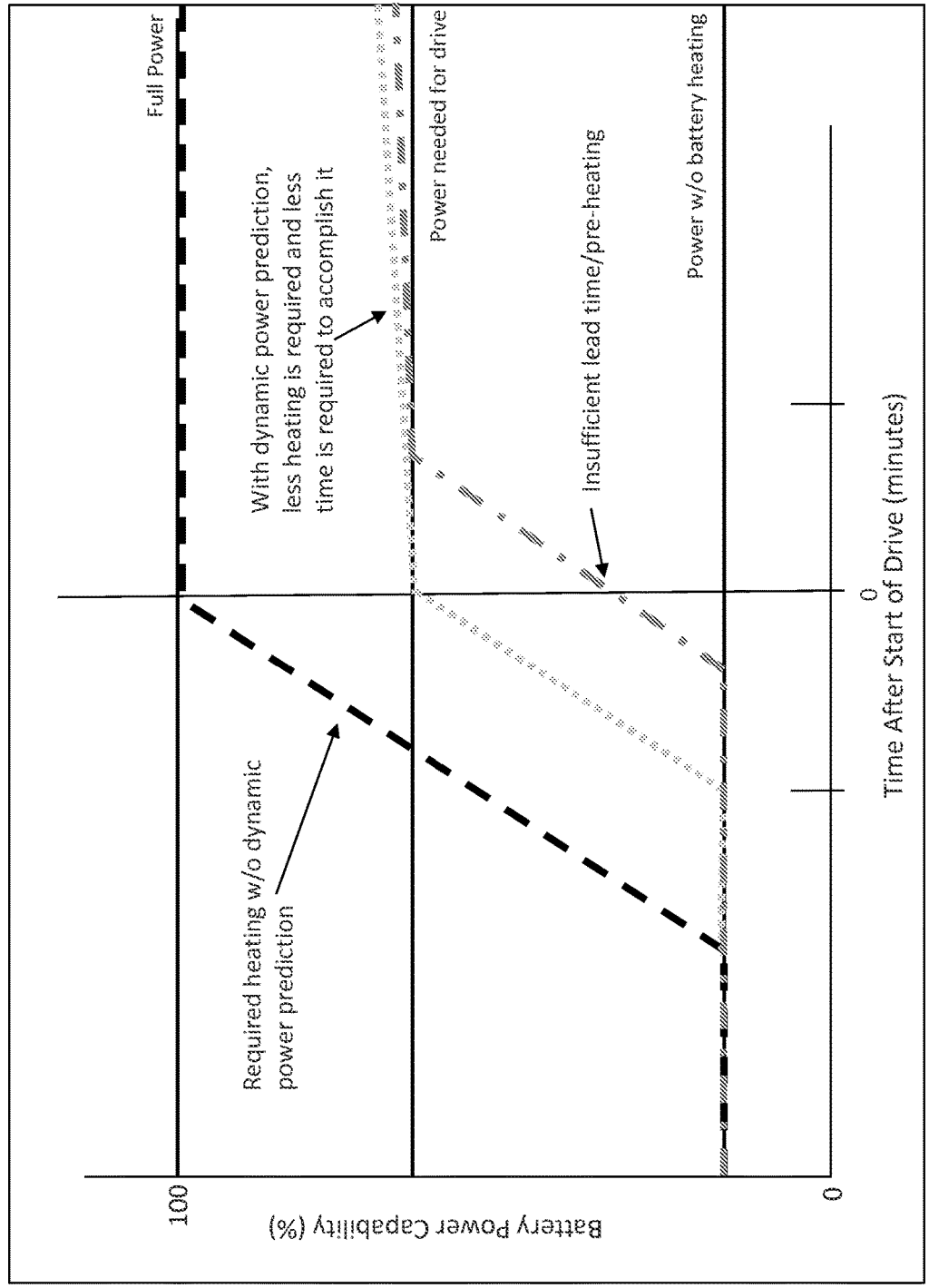
FIGS. 6A and 6B depict charts describing dynamically pre-heating a battery according to certain embodiments.

FIG. 6A shows a chart illustrating battery power capability (expressed as a percentage of the maximum power) vs. time. The time is zero at the beginning of a drive, when a user enters the vehicle. Without dynamic heating, a battery is pre-heated to its maximum power, regardless of the type of drive expected. This approach is less than ideal because, as shown in the figure, extra heat is used to heat the battery beyond the level that is needed for an upcoming drive. If the vehicle is unplugged, furthermore, battery state of charge is lowered and the vehicle will have less available range for the upcoming drive. Thus, the extra heat is wasted and there is no corresponding benefit. On the other hand, where dynamic heating is used, the battery only pre-heats to a level that provides sufficient power for an upcoming drive, and the battery energy (or other pre-heating energy) is conserved. A related benefit is that pre-heating can occur over a shorter duration, as less time is needed to pre-heat the battery to the lower temperature/power level needed for the drive. Also shown in FIG. 6A is an example where pre-heating begins too late. In this case, the battery is not able to pre-heat to a sufficient level by the time the user gets in the car. This problem is common among various prior art pre-heating methods, as described herein. Because the battery does not have sufficient power at the time the user enters the car, the user may need to wait to begin her drive. Otherwise, the vehicle will be under-powered for the type of drive that the user desires.

Figure 6B:
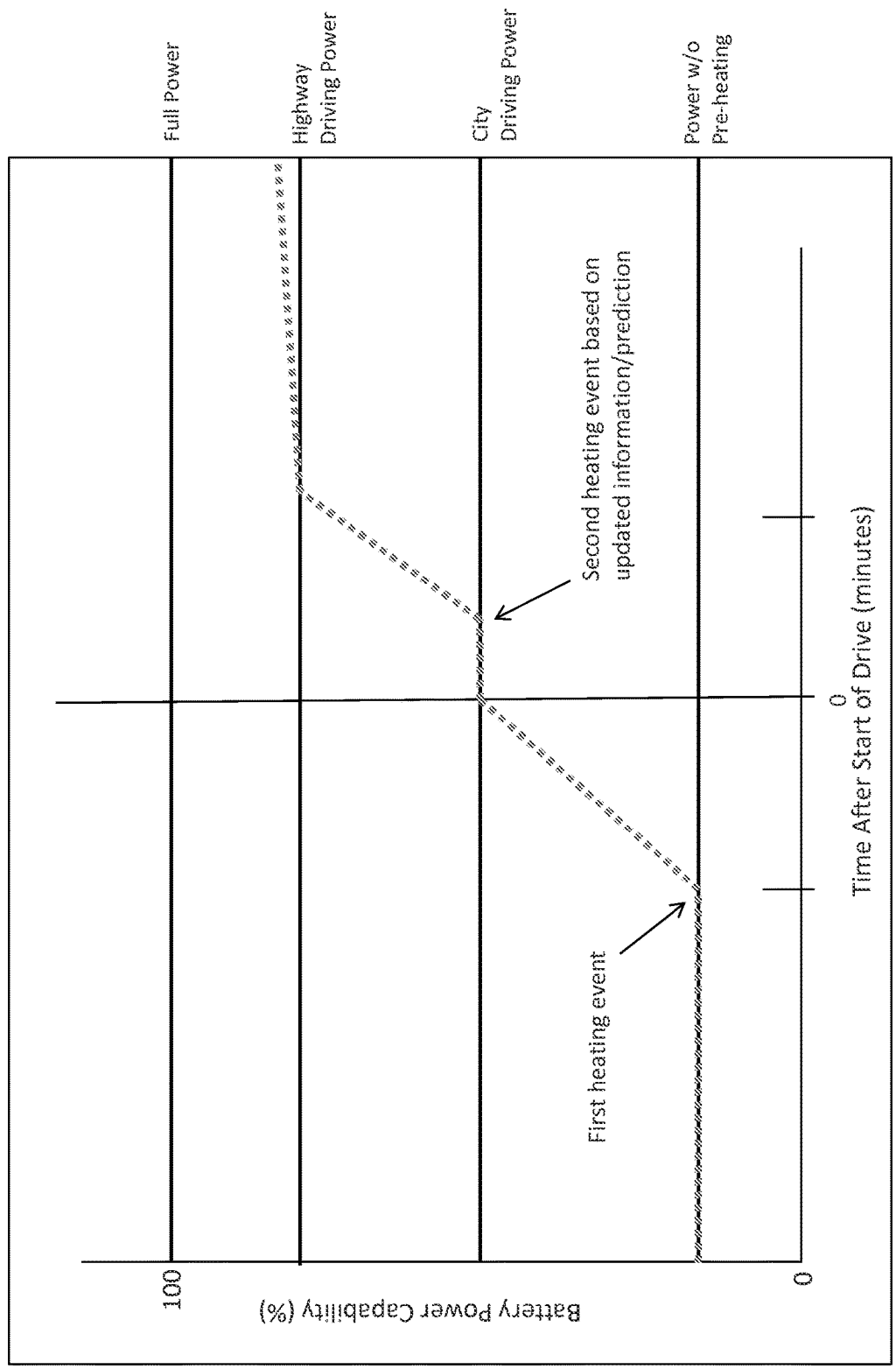

FIG. 6B also shows a chart depicting battery power capability vs. time. In this example, multiple battery heating events occur. The first heating event is a pre-heating event that occurs before the drive begins. This heating event may be initiated based on the methods described herein. The second heating event occurs after the drive starts. In a number of embodiments, the battery may be heated during a drive based on information that relates to the drive that is actually occurring. For example, the battery system may predict that a drive will occur at 10 a.m. Saturday, for a drive to the grocery store that involves only 2 miles of city driving. Based on this prediction, the battery system may pre-heat the battery to an initial level that allows for city driving. However, a user may enter the car around 10 a.m., and instead of driving to the grocery store, she begins driving toward the highway (e.g., to go to the beach). The battery system may recognize that the actual drive that is occurring is different from the drive that was predicted. The battery system may recognize/predict where the driver intends to go based on the newly available data (e.g., the fact that she is not going to the grocery store, and is instead driving toward the highway). Based on this information, the battery system may initiate a second heating event to ensure that the battery has sufficient power by the time the user enters the highway. In this way, the battery system may continuously monitor the drive that is actually occurring, compare it to the predicted drive, and make updated heating decisions based on all the available information.

The pre-heating (as well as any additional heating that occurs after the drive starts) may be done to achieve any desired level of power that is achievable by the vehicle. In some cases, pre-heating may be done to a degree that achieves the minimum power level to get the car moving (at all or safely) or to a power level that is minimally appropriate for the type of drive expected. In some other cases, a buffer may be used, such that the battery pre-heats to a level that provides slightly more power (e.g., 5% greater, or 10% greater) than is predicted to be needed. In still other cases, a larger buffer may be used, such that the battery pre-heats to a level that provides moderately more power (e.g., 20% greater) than is predicted to be needed for the drive. Pre-heating to relatively lower degrees/power levels saves needless energy, minimizes costs, and reduces component wear. On the other hand, pre-heating to a slightly higher degree/power level may enable driving that is more safe (e.g., to accommodate higher power driving than was predicted) and/or satisfying (e.g., for enthusiast drivers).

Figure 7:
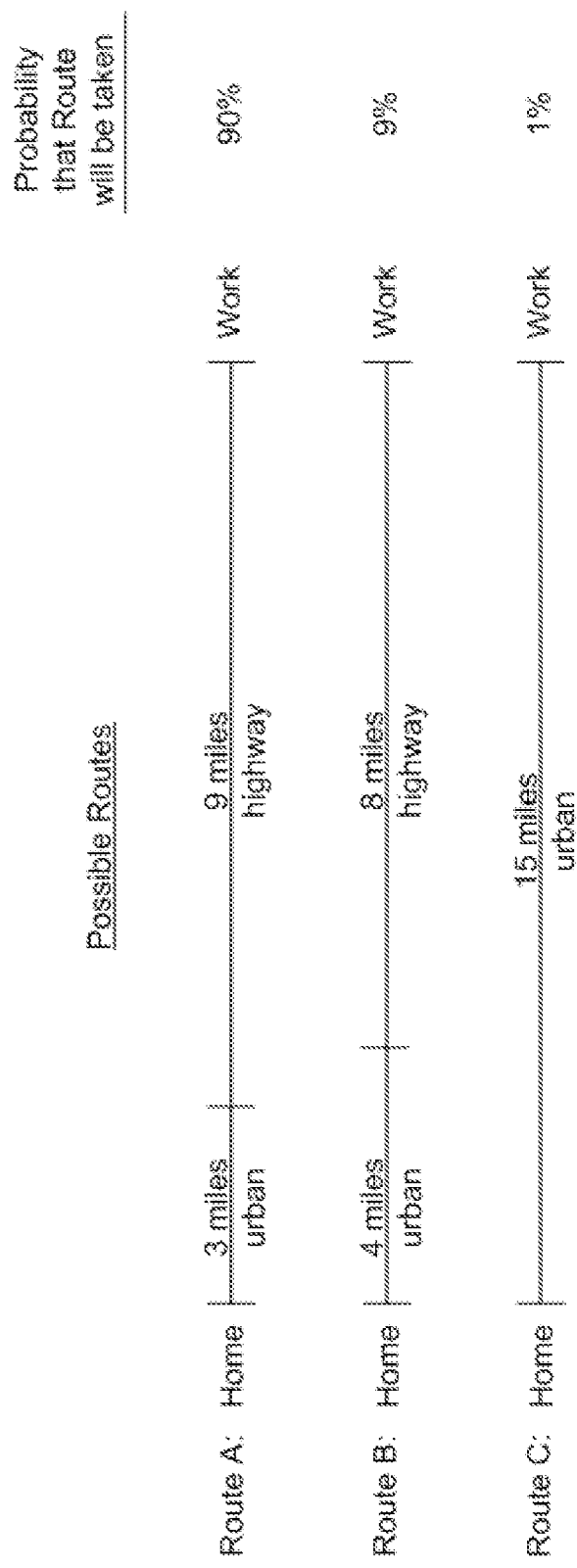
FIG. 7 illustrates various probability weighted routes that a user may take from home to work according to some embodiments.

FIG. 7 shows a summary of various routes that may be taken between a user's home and work. The trip may be about 12-15 miles total, depending on the route. Route A involves 3 miles of urban driving followed by 9 miles of highway driving. Route B involves 4 miles of urban driving followed by 8 miles of highway driving. Route C involves 15 miles of urban driving. Based on various inputs described above, for example current location/map information, calculation of route options, determination of optimal route choices, traffic conditions, and historical choices, it is determined that there is a 90% probability that the vehicle will drive over Route A, a 9% probability that the vehicle will drive over Route B, and a 1% chance that the vehicle will drive over Route C. Route C is assumed to be longer due to less direct surface streets that are taken in this urban route. Based on these probability weighted route choices, the system may determine that Route A is most likely, meaning that the battery should be pre-heated to a temperature adequate to provide sufficient power for immediate urban driving, as well as proper power for delayed highway driving. As noted above, the optimal temperature for pre-heating takes into account the fact that the battery can continue to heat up to a temperature sufficient for providing highway-level power while the vehicle is driving on city streets.

Figure 8:
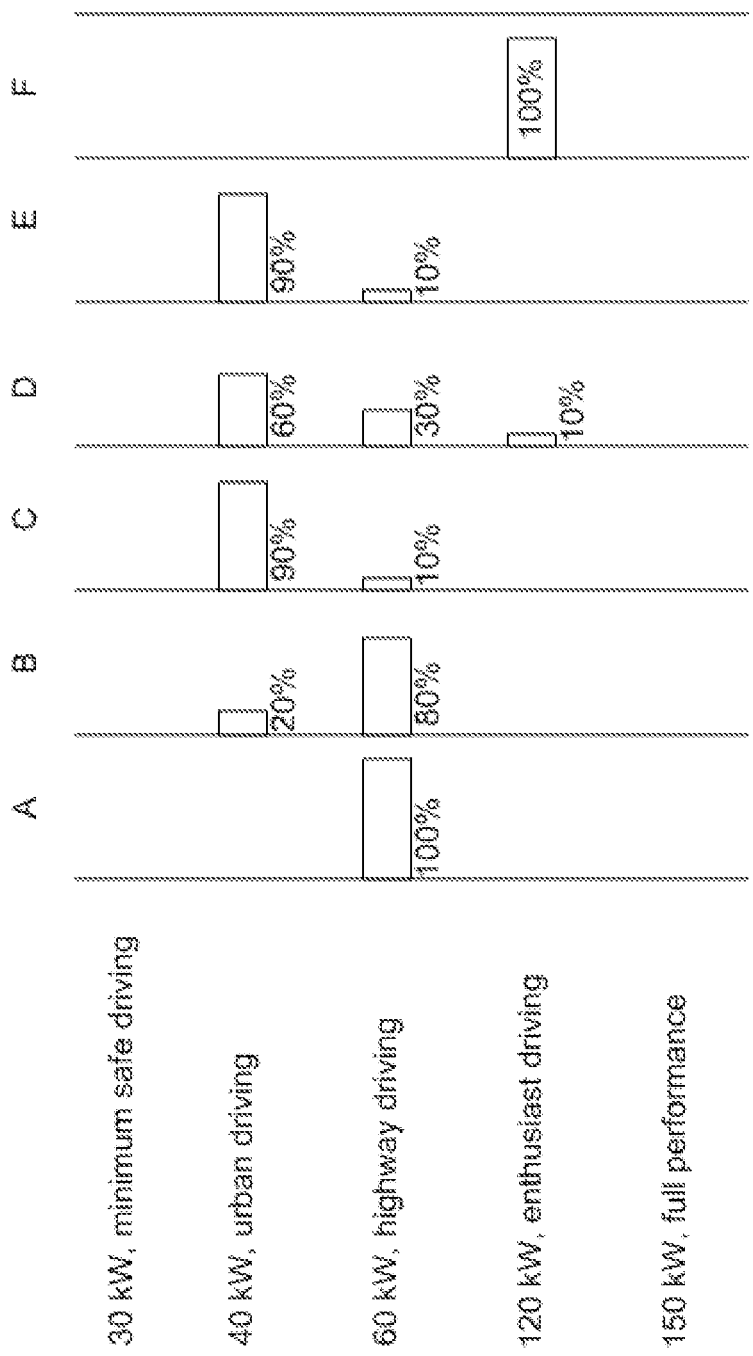
FIG. 8 presents numerous examples illustrating the probability that an upcoming drive will utilize the various depicted power levels.

FIG. 8 provides a summary of various examples presented below related to determining the optimal power level for an upcoming drive. These examples assume a 3000 lb vehicle having a 150 kW motor when at full performance. The power levels are assumed to be 30 kW for minimum safe driving performance, 40 kW for urban driving, 60 kW for highway driving at highway speed, 120 kW for an enthusiast driver, and 150 kW for full performance. A power level confidence threshold is assumed to be 70%. This represents the confidence level at which pre-warming will occur at a particular power level. The power level confidence threshold may be the same or different as a probability threshold used to determine whether or not a drive is likely to occur. Examples A-F are presented.

In Example A, the vehicle defaults to a power level of 60 kW for optimal performance. This may represent a default mode. In Example B, a user will leave from home Monday morning when there is no traffic. These are used as inputs to determine that there is an 80% confidence that highway driving will be undertaken and a 20% confidence that urban driving will be undertaken. The confidence (80%) exceeds the power level confidence threshold (70%), so pre-heating will occur to raise the temperature of the battery to enable 60 kW of driving power. In Example C, a user will leave home Monday morning when there is substantial traffic on the highway. These are used as inputs to determine that there is a 90% confidence that urban driving will be undertaken and a 10% confidence that highway driving will be undertaken. The confidence level (90%) exceeds the power level confidence threshold, so the battery will be pre-heated to a temperature that allows the battery to operate at 40 kW. In Example D, a user will leave home on Sunday morning. Based on this input, there is a 60% confidence that urban driving will be undertaken and a 30% confidence that highway driving will be undertaken. Neither of these confidence levels, alone, reach the 70% power level confidence threshold. However, when taken together, these confidence levels exceed the power level confidence threshold and the system, in one embodiment, pre-warms to the higher 60 kW power level since insufficient confidence exists that only power required for urban driving will be required. Here, the optimal power level is determined to be 60 kW. In effect, the probabilities are treated cumulatively (e.g., from low power to high power or high power to low power), and a rounding up is used. Rounding down may also be used in some cases (e.g., a determined optimal power level of 40 kW in Example D). In Example F, the vehicle is operating in a user specified enthusiast mode. An enthusiast mode may ensure that sufficient power is available for quickly accelerating and driving fast, for instance. In this example, there is 100% confidence that 120 kW of power is desired, thereby exceeding the 70% power level confidence threshold, so the battery pre-heats to a temperature that allows this performance level.

Figure 9:
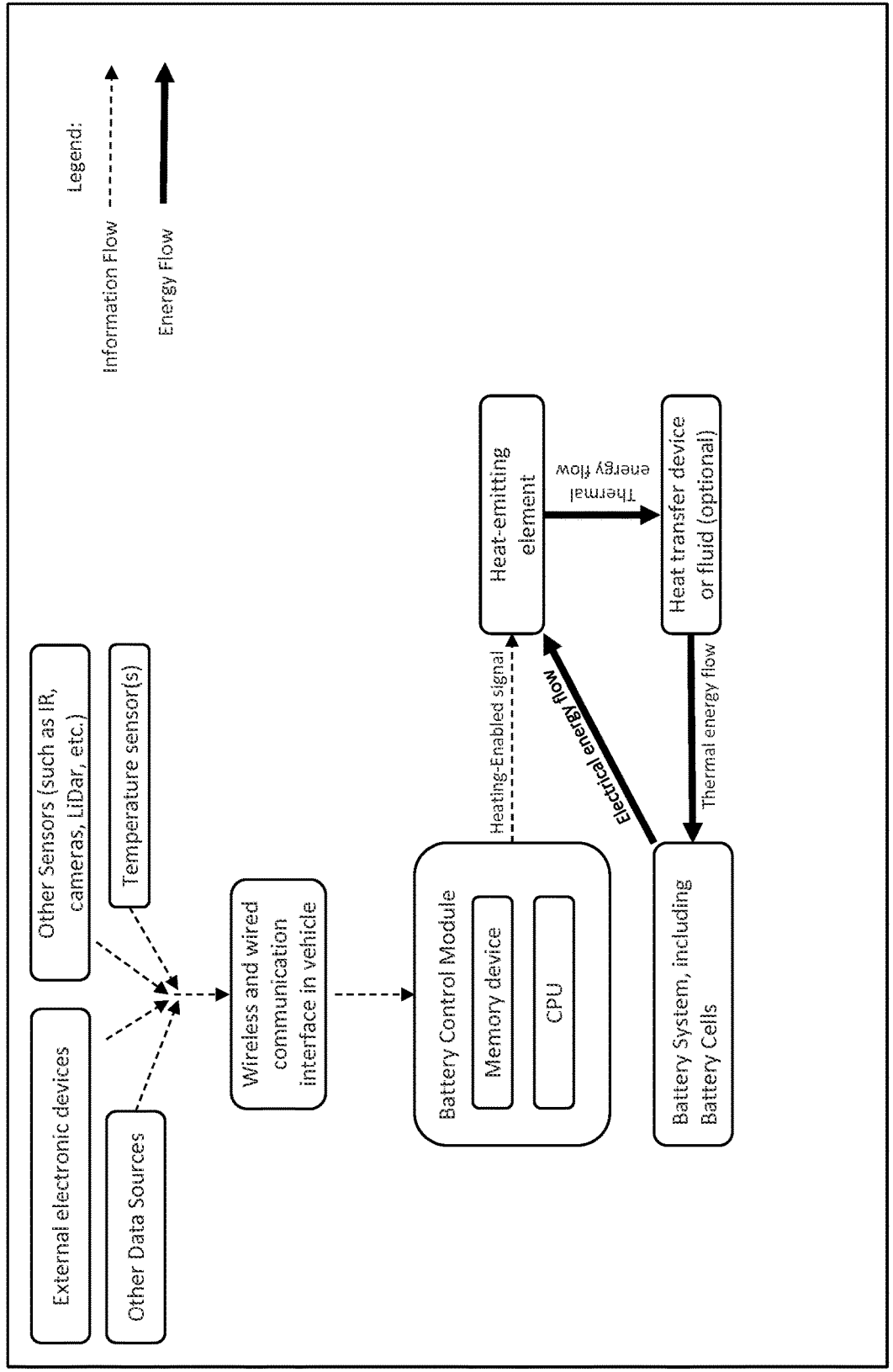
FIG. 9 illustrates a diagram of a thermal management and thermal control system.

FIG. 9 presents a diagram of a thermal control system for heating a battery according to certain embodiments. Data from various sources including, but not limited to, signals from external electronic devices or other external sources, signals from sensors such as infrared, cameras, LiDar, etc., and signals from temperature sensor(s) are fed into a battery system controller via wireless and/or wired communication, in some cases using a communication interface in the vehicle or elsewhere. The information may be transmitted to a battery control module (also referred to as a controller, battery controller, battery control system, etc.), which includes at least a memory device and a processor. As noted elsewhere herein, the memory device and/or processor may be provided on-car or off-car. The various inputs are processed to determine the relevant outputs (e.g., expected start time, confidence level, expected drive type/power level needed). When it is determined that pre-heating should occur at a relevant time, a signal is sent by the battery control module to a heat-emitting element. This signal indicates that pre-heating should occur at a relevant time, for a particular duration. The heat-emitting element may be any element designed to raise the temperature of the batteries (e.g., heater, heat exchange mechanism, internal resistance, etc.), as discussed further above. The heat-emitting element provides thermal energy flow either directly to the battery system (e.g., battery cells) or (optionally) to a heat transfer device or fluid, which then heats the battery system. FIG. 9 shows the transfer of both information (shown in dotted lines) and heat (shown in solid lines).

In some embodiments, the controller includes control logic, which may be implemented using a processor, card, memory, board, network connection, or a combination of any of these. In general, the control logic used to control the controller can be designed or configured in hardware and/or software. In other words, the instructions for controlling the apparatus may be hard coded or provided as software. In may be said that the instructions are provided as "programming". Such programming is understood to include logic of any form including hard coded logic in digital signal processors and other devices which have specific algorithms implemented as hardware. Programming is also understood to include software or firmware instructions that may be executed on a general purpose processor. In certain embodiments, the control logic is partially or fully implemented in a processor such as a programmable logic device (PLD), field programmable gate array (FPGA), application specific integrated circuit (ASIC), general purpose microprocessor, or similar integrated circuit. In some embodiments, instructions for controlling the heating apparatus are stored on a memory device associated with the controller or are provided over a network. Examples of suitable memory devices include semiconductor memory, magnetic memory, optical memory, and the like. The computer program code for controlling the heating apparatus can be written in any conventional computer readable programming language. Compiled object code or script is executed by the processor to perform the tasks identified in the program.

Feedback and Refinement

As noted with reference to Tables 2 and 3, each input parameter may be assigned a relative importance factor, which defines how to weigh the input in the determination of time of expected drive start/confidence level/expected duty cycle/power level. As the vehicle is used over time and the control system is tested repeatedly, a memory device in the control system may record actual drive starts and battery system duty cycles and compare them with predicted drive starts and battery system duty cycles. This data allows the control system to continually refine the values of relative importance factors for each type of data and combination of data to continuously improve the predictive power of the method. The pre-determined importance factors (e.g., initial importance factors such as those from a manufacturer) and usage-based importance factors (e.g., importance factors based on analysis of actual driving patterns) are analyzed to come up with a combined importance factor, which can be used in future predictions of start time and battery system duty cycle. In other words, the determination of whether and when driving will occur, and the determination of a desired power level for an upcoming drive, can be improved through feedback that evaluates past predictions and compares them to a vehicle's actual driving record. This feedback, over time, favors the most predictive inputs and combinations of inputs, such that over time a battery control system may learn to predict driving patterns with a very high degree of accuracy based on factors (e.g., input parameters and relative importance factors) that may be particular to an individual user.

What is claimed is:

1. A secondary battery thermal management system, the system comprising:
   at least one temperature sensor for determining a temperature of a battery, the battery being a secondary battery;
   at least one wireless communications device for receiving at least one of a plurality of input parameters; and
   an electronic device configured for determining an optimized battery temperature as a function of a predicted driving route;
   assigning weighting factors to each of the plurality of input parameters;
   providing a control signal to either the battery, or a heating device, to heat the battery to the optimized battery temperature with a heating lead time of at least a minute or more, and
   comparing a vehicle's actual driving record to the predicted driving route, and adjusting the weighting factors based on the comparison.

2. The system of claim 1, wherein the plurality of input parameters comprises vehicle use information selected from the group consisting of a statistical probability of drive starts as a function of previous drive start, drive times, time of drive starts, drive lengths, drive routes, geography of drives, driving pattern information, past battery warming conditions, past vehicle performance conditions, past battery performance conditions, feedback information, and combinations thereof.

3. The system of claim 1, wherein the plurality of input parameters comprises direct user input including at least one of drive start time, driving schedule, and driving preferences.

4. The system of claim 1, wherein the plurality of input parameters are selected from the group consisting of historical personal inputs, current sensed personal inputs, current referenced personal inputs, historical general inputs, current general inputs, and combinations thereof.

5. The system of claim 4, wherein the current referenced personal inputs are selected from the group consisting of user instructions and/or preferences, a status of an additional transportation provider or transit option, a user's calendar/schedule, a user's upcoming commitments, a user's email messages, text messages, a smart device, and combinations thereof.

6. The system of claim 1, wherein the plurality of input parameters comprises a relationship between temperature of the battery and at least one of battery energy capacity, state of charge of battery, and age of battery.

7. The system of claim 1, the plurality of input parameters comprise
   vehicle information selected from the group consisting of weight of the vehicle, motor power of the vehicle, powertrain of vehicle, thermal system configuration of vehicle, powertrain efficiency of vehicle, vehicle minimum power output level for safe driving, and combinations thereof; and
   expected drive type selected from the group consisting of city driving, highway driving, aggressive driving, non-aggressive driving, high-traffic, stop light traffic, and combinations thereof,
   wherein analyzing the plurality of input parameters includes determining a power level based on the expected drive type and vehicle information.

8. The system of claim 1, wherein the optimized battery temperature is at least 20° C.

9. The system of claim 1, wherein the optimized battery temperature is at least 30° C.

10. The system of claim 1, wherein the optimized battery temperature is at least 40° C.

* * * * *